US008953696B2

(12) United States Patent
Stoye

(10) Patent No.: US 8,953,696 B2
(45) Date of Patent: Feb. 10, 2015

(54) SIGNAL DECODING SYSTEMS

(75) Inventor: William Stoye, Cambridge (GB)

(73) Assignee: Intel Corporation, Santa Clara, CA (US)

( * ) Notice: Subject to any disclaimer, the term of this patent is extended or adjusted under 35 U.S.C. 154(b) by 1553 days.

(21) Appl. No.: 12/462,537

(22) Filed: Aug. 4, 2009

(65) Prior Publication Data

US 2010/0034323 A1 Feb. 11, 2010

Related U.S. Application Data

(60) Provisional application No. 61/086,682, filed on Aug. 6, 2008.

(30) Foreign Application Priority Data

Aug. 5, 2008 (GB) .................................. 0814295.2

(51) Int. Cl.
*H04K 1/10* (2006.01)
*H04L 27/28* (2006.01)
*H04L 25/06* (2006.01)
*H04L 1/00* (2006.01)
*H04L 27/26* (2006.01)

(52) U.S. Cl.
CPC .......... *H04L 27/2647* (2013.01); *H04L 25/067* (2013.01); *H04L 1/0045* (2013.01)
USPC ........... 375/260; 375/261; 375/267; 375/316; 375/341

(58) Field of Classification Search
USPC ........................... 375/260, 261, 267, 316, 341
See application file for complete search history.

(56) References Cited

U.S. PATENT DOCUMENTS 6,574,209 B1 6/2003 Kosaka
6,898,438 B1 5/2005 Uchida
(Continued)

FOREIGN PATENT DOCUMENTS

EP 1143627 10/2001
EP 1513293 3/2005
(Continued)

OTHER PUBLICATIONS

Vineet Srivastava, "Practical Algorithms for Soft-Demapping of Dual-Carrier Modulated Symbols," Communication Systems, 2006. ICCS 2006. 10th IEEE Singapore International Conference on Oct. 2006 pp. 1-5.

*Primary Examiner* — Freshteh N Aghdam
(74) *Attorney, Agent, or Firm* — Sutherland, Asbill & Brennan, LLP

(57) ABSTRACT

We describe an ultra wideband (UWB) orthogonal frequency division multiplexed (OFDM) modified dual carrier modulation (MDCM) decoder comprising: first and second inputs to input first and second signals for first and second OFDM carriers; third and fourth inputs for respective third and fourth signals comprising channel quality estimates for the OFDM carriers; a set of integer arithmetic units coupled to said first, second, third and fourth inputs to form a set of intermediate terms; a first set of adders to form first and second sets of combinations of said intermediate terms, one for each MDCM coded bit value; a compare-select stage to select a first and second minimum valued said combination of said intermediate terms from said first and second set; and a subtracter to determine a log likelihood ratio (LLR) value for said bit from said first and second minimum valued combinations.

8 Claims, 13 Drawing Sheets

(56) References Cited

U.S. PATENT DOCUMENTS

| | | | |
|---|---|---|---|
| 7,945,008 B2 * | 5/2011 | Milliner et al. | 375/367 |
| 8,102,930 B2 * | 1/2012 | Huang et al. | 375/261 |
| 2007/0058745 A1 * | 3/2007 | Watanabe | 375/264 |
| 2007/0091984 A1 * | 4/2007 | Batra et al. | 375/130 |
| 2008/0046132 A1 | 2/2008 | Dalsgaard et al. | |
| 2008/0056392 A1 * | 3/2008 | Park et al. | 375/260 |
| 2008/0260075 A1 * | 10/2008 | Waters et al. | 375/341 |
| 2008/0309526 A1 * | 12/2008 | Wang | 341/107 |
| 2009/0122890 A1 * | 5/2009 | Wu | 375/261 |

FOREIGN PATENT DOCUMENTS

| | | |
|---|---|---|
| GB | 2339113 | 1/2000 |
| GB | 2355367 | 4/2001 |
| GB | 2447080 | 9/2008 |
| WO | WO 00/31990 | 6/2000 |
| WO | WO 02/067442 | 8/2002 |
| WO | WO 2006/096887 | 9/2006 |
| WO | WO 2008/004112 | 1/2008 |
| WO | WO 2008/020300 | 2/2008 |

* cited by examiner

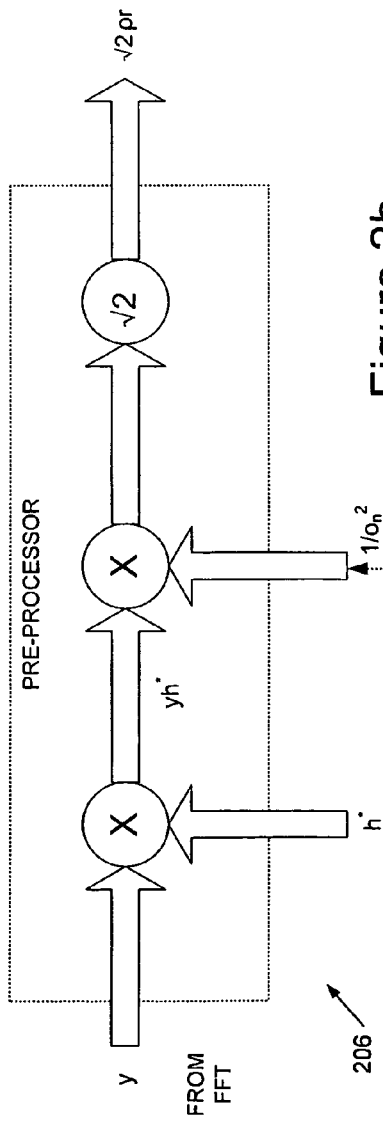
Figure 2b
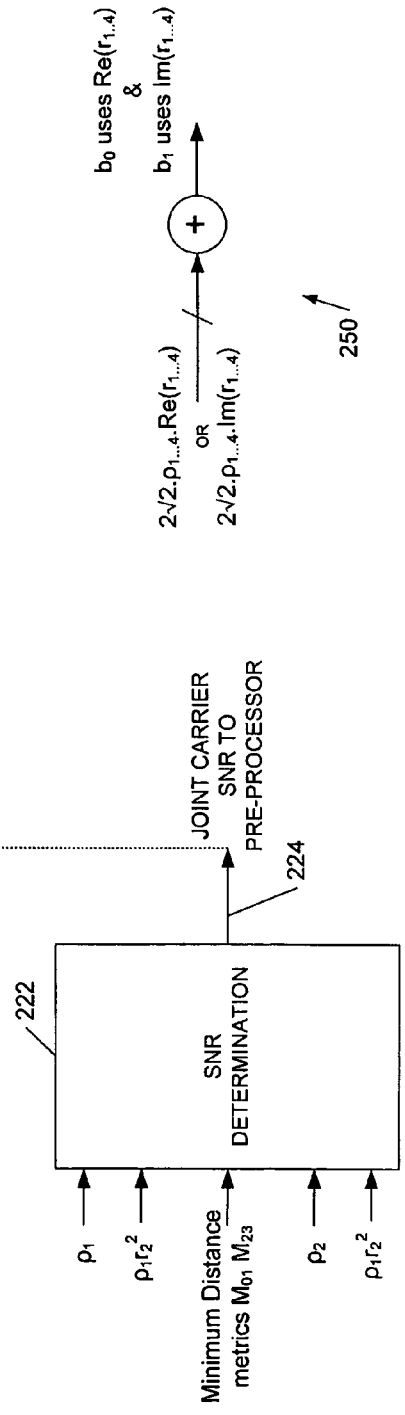
Figure 2c
Figure 2d (NOT TO SCALE)

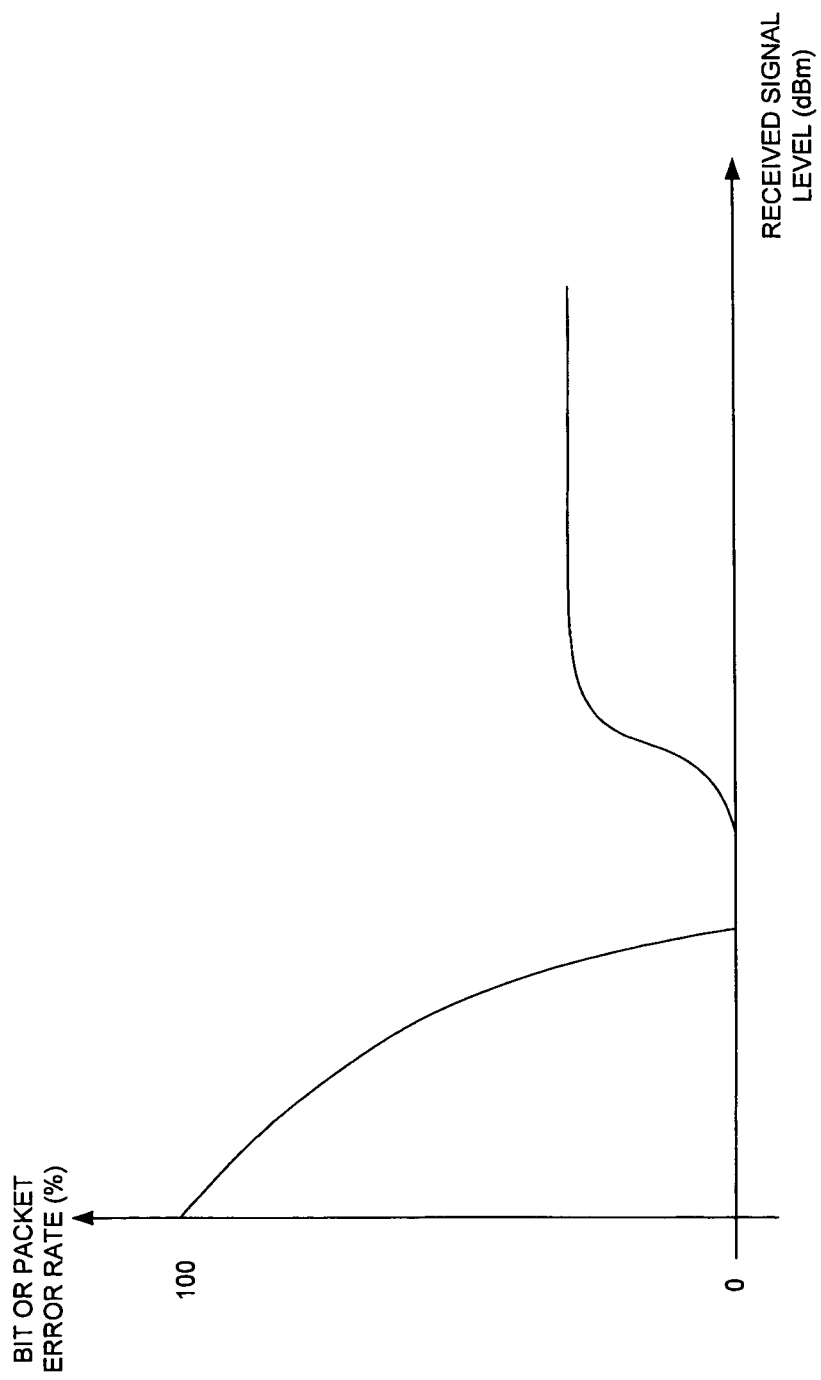

SIGNAL DECODING SYSTEMS

CROSS REFERENCE TO OTHER APPLICATIONS

This application claims priority to U.S. Provisional Patent Application No. 61/086,682 entitled SIGNAL DECODING SYSTEMS filed Aug. 6, 2008 which is incorporated herein by reference for all purposes, and to Great British Patent Application No. GB0814295.2 entitled SIGNAL DECODING SYSTEMS filed Aug. 5, 2008 which is incorporated herein by reference for all purposes.

BACKGROUND OF THE INVENTION

1. Field

This invention relates to apparatus, methods and computer program code for decoding MDCM (modified dual carrier modulation) modulated signals, in particular MDCM modulated OFDM (orthogonal frequency division multiplexed) signals such as those proposed to be used in UWB (ultra wideband) communications systems.

2. Background Art

The MultiBand OFDM (orthogonal frequency division multiplexed) Alliance (MBOA), more particularly the WiMedia Alliance, has published a standard for a UWB physical layer (PHY) for a wireless personal area network (PAN) supporting data rates of up to 480 Mbps. This document was published as, "MultiBand OFDM Physical Layer Specification", release 1.1, Jul. 14, 2005; release 1.2 is now also available. The skilled person in the field will be familiar with the contents of this document, which are not reproduced here for conciseness. However, reference may be made to this document to assist in understanding embodiments of the invention. Further background material may be found in Standards ECMA-368 and ECMA-369.

Broadly speaking a number of band groups are defined, one at around 3 GHz, a second at around 6 GHz, each comprising three bands; the system employs frequency hopping between these bands in order to reduce the transmit power in any particular band. The OFDM scheme employs 112-122 subcarriers including 100 data carriers (a total FFT size of 128 carriers) which, at the fastest encoded rate, carry 200 bits using DCM (dual carrier modulation). A ¾ rate Viterbi code results in a maximum data under the current version of this specification of 480 Mbps.

Broadly speaking, in DCM two carriers are employed each using points of a 16 QAM (quadrature amplitude modulation) constellation, but only sixteen combinations of the points are used to encode data—that is, there are only certain allowed combinations of the constellation points on the two carriers.

Details of the UWB DCM modulation scheme can be found in the "MultiBand OFDM physical layer specification" (ibid), in particular at section 6.9.2, which section is hereby incorporated by reference into the present specification.

In detail, a group of two hundred coded and interleaved binary data bits is converted into one hundred complex numbers by grouping the two hundred coded bits into fifty groups of 4 bits each. Each group is represented as $(b[g(k)], b[g(k)+1], b[g(k)+50], b[g(k)+51])$, where $k \in [0,49]$ and $$g(k) = \begin{cases} 2k & k \in [0, 24] \\ 2k + 50 & k \in [25, 49] \end{cases}$$

Each group of 4 bits is mapped onto a four-dimensional constellation and converted into two complex numbers, d[k] and d[k+50], using the mapping shown in FIG. 1a. The complex numbers are normalised using a normalisation factor of $1/\sqrt{10}$. The constellations shown in FIG. 1a can also be expressed using Table 1 below:

TABLE 1

| Input Bits | d[k] I-out | d[k] Q-out | d[k] + 50 I-out | d[k] + 50 Q-out |
|---|---|---|---|---|
| 0000 | −3 | −3 | 1 | 1 |
| 0001 | −3 | −1 | 1 | −3 |
| 0010 | −3 | 1 | 1 | 3 |
| 0011 | −3 | 3 | 1 | −1 |
| 0100 | −1 | −3 | −3 | 1 |
| 0101 | −1 | −1 | −3 | −3 |
| 0110 | −1 | 1 | −3 | 3 |
| 0111 | −1 | 3 | −3 | −1 |
| 1000 | 1 | −3 | 3 | 1 |
| 1001 | 1 | −1 | 3 | −3 |
| 1010 | 1 | 1 | 3 | 3 |
| 1011 | 1 | 3 | 3 | −1 |
| 1100 | 3 | −3 | −1 | 1 |
| 1101 | 3 | −1 | −1 | −3 |
| 1110 | 3 | 1 | −1 | 3 |
| 1111 | 3 | 3 | −1 | −1 |

We have previously described, in GB0703969.6 and in U.S. Ser. No. 11/715,363 (both hereby incorporated by reference), some improved approaches for decoding DCM modulated data.

An extension to the Wimedia OFDM physical layer (PHY) specification has been proposed which supports data rates of up to 1024 Mbps. For data rates above 480 Mpbs (640 Mbps-1024 Mbps) an LDPC (Low Density Parity Check) forward error correcting code is proposed with coding rates of 1/2, 5/8, 3/4 and 4/5, and the coded data is mapped onto a four-dimensional constellation using modified dual carrier modulation (MCDM).

Details of the planned UWB MDCM modulation scheme can be found in the WiMedia PHY Data Rate Extension Working Text of Jun. 18, 2008, in particular at section 6.9.3, which section is hereby incorporated by reference into the present specification. This material may in future appear at section 6.9.3 of the "MultiBand OFDM physical layer specification" (ibid), which would be an additional section in this document.

In detail, the LDPC coded data is grouped into sets of 400 bits and each of these sets is converted into a set of 100 complex numbers using MCDM and modulated onto a symbol.

The 400 bits modulated on each symbol are grouped into 50 groups of 8 bits. Each group is represented as $b[8 \times k], b[8 \times k+1], \ldots, b[8 \times k+7]$ where $k \in [0,49]$, and each group of 8 bits is converted into two complex numbers (d[k], d[k+50]). These values are generated by means of two intermediate values $x_a$ and $x_b$ which are determined by the values in Table 2 below. The values $x_a$ and $x_b$ are generated as Gray coded 16 QAM constellation points, selected for $x_a$ by the input bits $b[8 \times k], \ldots, b[8 \times k+3]$ and for $x_b$ by bits $b[8 \times k+4], \ldots, b[8 \times k+7]$. The (complex OFDM subcarrier) values d[k] and d[k+50] are then generated using:

$$\begin{pmatrix} d[k] \\ d[k+50] \end{pmatrix} = \begin{pmatrix} 4 & 1 \\ 1 & -4 \end{pmatrix} \times \begin{pmatrix} x_a \\ x_b \end{pmatrix} \times 1/\sqrt{170},$$

where $1/\sqrt{170}$ is a normalisation factor.

TABLE 2

| input bits | I-out | Q-out |
|---|---|---|
| 0000 | 3 | 3 |
| 0001 | 1 | 3 |
| 0010 | −3 | 3 |
| 0011 | −1 | 3 |
| 0100 | 3 | 1 |
| 0101 | 1 | 1 |
| 0110 | −3 | 1 |
| 0111 | −1 | 1 |
| 1000 | 3 | −3 |
| 1001 | 1 | −3 |
| 1010 | −3 | −3 |
| 1011 | −1 | −3 |
| 1100 | 3 | −1 |
| 1101 | 1 | −1 |
| 1110 | −3 | −1 |
| 1111 | −1 | −1 |

There is a need for decoding techniques for MCDM coded data.

SUMMARY OF THE INVENTION

According to an embodiment of the present invention, there is therefore provided a modified dual carrier modulation (MDCM) decoder for MDCM decoding of an orthogonal frequency division multiplexed (OFDM) signal, the decoder comprising: first and second inputs to input first and second signals dependent on signals from respective first and second carriers of the OFDM signal; third and fourth inputs for respective third and fourth signals responsive to respective first and second channel quality estimates for the first and second carriers; a set of arithmetic units coupled to the first, second, third and fourth inputs to form a set of intermediate terms comprising integer multiples of signals derived from the first, second, third and fourth signals; a first set of adders coupled to the set of arithmetic units to form first and second sets of combinations of the intermediate terms, one set for each binary value of a bit of MDCM coded data encoded on the first and second carriers; at least one compare-select stage coupled to the set of adders to select a first minimum valued the combination of the intermediate terms from the first set and to select a second minimum valued the combination of the intermediate terms from the second set; and a subtractor to determine a log likelihood ratio (LLR) value for the bit from the first and second minimum valued combinations.

Broadly speaking, MCDM modulation is a modulation scheme in which more than four bits are simultaneously encoded across two carriers. In embodiments of the decoder, each of the first and second inputs receives real and imaginary components of a complex valued signal, but derived from the respective first and second carriers of a received OFDM signal. In some embodiments the first and second signals comprise a (scaled) product of a received signal derived from the carrier and a respective channel quality estimate for the carrier. For example, in embodiments the OFDM sub-carriers are corrected by respective channel quality estimates prior to decoding. However, in other embodiments a channel deformed version of the expected constellation points may instead be employed. In still other embodiments a rotated version of the first and second carriers may be employed and compared against a rotated version of the constellation points. In this latter case, the first and second signals may comprise a product of a (complex) received signal for a carrier and the corresponding squared channel quality estimate.

In embodiments, the first and second sets of combinations of intermediate terms each define a set of distances from a set of MDCM constellations points in which the decoded bit has respective binary values of one and zero. In embodiments, the modified DCM signal comprises a signal in which each carrier encodes a set of bits and in which a fraction of the energy of each carrier is added to the other carrier. In this way the effective number of constellation points is squared since each constellation point of one carrier is represented as a set of constellation points representing the fractional addition of the other carrier.

In some embodiments, each arithmetic unit comprises a set of adders. Each of these sets of adders is configured to provide a plurality of outputs comprising a plurality of different integer multiples of the respective input (first, second, third or fourth signal). As explained below, the various input signals will in general will be pre-scaled. Depending upon the configuration of input signals, for example, whether or not rotated input signals and a rotated constellation is employed, these outputs may comprise odd integer multiples of the first and second (received) signals, and squared odd integer multiples of the third and fourth (channel quality estimate) signals. In embodiments, eight bits are decoded in parallel and each set of adders provides eight outputs (counting multiplication by unity as an output).

It has been recognized that when a plurality of bits is decoded in parallel many of the intermediate terms which are employed are the same. Thus in some implementations, a partial or complete set of the intermediate terms used in the various combinations of the intermediate terms employed for decoding the different bits of the plurality of bits is generated and then combined as needed for determining the log likelihood ratios of the decoded bits.

In embodiments, a combination of intermediate terms comprises a combination of first and second channel intermediate terms and first and second signal intermediate terms. The former are derived from (squared) integer multiples of the third and fourth (channel quality estimate) signals. The latter are derived from integer multiples of the first and second signals; more particularly a first the signal intermediate term may be derived from a product of a real of imaginary received signal component on a first carrier and a signal-to-noise ratio (SNR) or channel power of the carrier, and likewise for the second signal intermediate term. In embodiments, a further set of adders then combines pairs of channel and pairs of signal intermediate terms to provide combinations of intermediate terms for use in determining bit LLR values.

More particularly each combination of intermediate terms in effect may define a distance of (signals on two carriers of) a received signal from a pair of constellation points for which the bit has the value of either zero or one. Thus, in embodiments there are eight combinations of intermediate terms for a bit value of zero, and eight combinations of intermediate terms for a bit value of one and the LLR value of a bit can be determined by identifying the minimum value of each group of combinations of intermediate terms corresponding to a bit value and then subtracting one from the other.

In the above described aspects and embodiments of the invention, a channel quality estimate may comprise, for example, a signal level or signal-to-noise ratio of a respective OFDM carrier.

In embodiments of the decoder, four or eights bits are decoded substantially in parallel, depending upon how much of the decoding hardware is shared. Decoding hardware which is shared between one or more bits may include one or more of: the arithmetic units, the adders, and the compare-select stage hardware employed to select minimum value combinations for bit LLR determination.

In another embodiment there is provided an OFDM MDCM decoder for decoding at least one bit value from a DCM OFDM signal, the decoder comprising: a first input to receive a first signal dependent on a product of a received signal from a first carrier of the MDCM OFDM signal and a channel quality estimate for the first carrier; a second input to receive a second signal dependent on a product of a received signal from a second carrier of the MDCM OFDM signal and a channel quality estimate for the second carrier; an arithmetic unit coupled to the first and second inputs and configured to form a plurality of joint distance metric terms including a first pair of joint distance metric terms derived from both the first and second signals and a second pair of joint distance metric terms derived from both the first and second signals, the first pair of joint distance metric terms corresponding to a first binary value of the bit value for decoding, the second pair of joint distance metric terms corresponding to a second binary value of the bit value for decoding; at least one selector coupled to receive the first pair of joint distance metric terms as inputs and to select one of the first pair of joint distance metric terms having a minimum value, and coupled to receive the second pair of joint distance metric terms as inputs and to select one of the second pair of joint distance metric terms having a minimum value; and an output coupled to the at least one selector and configured to output a likelihood value defining a likelihood of the at least one bit value having either the first or the second binary value responsive to a difference between the selected one of the first pair of joint distance metric terms and the selected one of the second pair of joint distance metric terms.

Embodiments of the invention further provide a UWB receiver, and a UWB transceiver, incorporating a MDCM decoder as described above.

In a further related embodiments, there is provided a method of decoding an MCDM OFDM signal, the method comprising: inputting first and second signals dependent on signals from respective first and second carriers of the OFDM signal; inputting third and fourth signals responsive to respective first and second channel quality estimates for the first and second carriers; generating a set of intermediate terms comprising integer multiples of signals derived from the first, second, third and fourth signals; generating first and second sets of combinations of the intermediate terms, one set for each binary value of a bit of MDCM coded data encoded on the first and second carriers; selecting a first and second minimum valued the combination of the intermediate terms respectively from each of the first and second sets; and determining a log likelihood ratio (LLR) value for the bit from the first and second minimum valued combinations.

Embodiments of the invention further provide a method of determining a bit log likelihood ratio, LLR for an MDCM (modified dual carrier modulation) modulated OFDM signal, the method comprising calculating a value for $LLR(b_n) =$ $\min_{x_j \in S0} (\rho_1 \|r_1 - x_j^1\|^2 + \rho_2 \|r_2 - x_j^2\|^2) - \min_{x_i \in S1} (\rho_1 \|r_1 - x_i^1\|^2 + \rho_2 \|r_2 - x_i^2\|^2)$ where $x_j \in S0$ represents a set of MDCM constellation points for which $b_n$ has a first binary value and $x_i \in S1$ represents a set of MDCM constellation points for which $b_n$ has a second, different binary value; $x_j^1$ and $x_j^2$ and $x_i^1$ and $x_i^2$ represent constellation points for $x_j$ and $x_i$ in different first and second constellations of said MDCM modulation respectively, the superscripts labelling constellations; $\rho_1$ and $\rho_2$ representing signal levels or signal-to-noise ratios of first and second OFDM carriers modulated using said first and second constellations respectively; $r_1$ and $r_2$ representing equalised received signal values from said first and second OFDM carriers respectively; min ( ) representing determining a minimum value; and $\|\cdot\|$ representing a distance metric.

Still further embodiments of the invention provide a method of decoding an MDCM (modified dual carrier modulation) modulated OFDM signal, the method comprising: inputting first received signal data representing modulation of a multibit data symbol onto a first carrier of the OFDM signal using a first constellation; inputting second received signal data representing modulation of the multibit data symbol onto a second, different carrier of the OFDM signal using a second, different constellation; determining a combined representation of the first and second received signal data, the combined representation representing a combination of a distance of a point representing a bit value of the multibit data from a constellation point in each of the different constellations; and determining a decoded value of a data bit of the multibit data using the combined representation; wherein the determining of a decoded value comprises determining a log likelihood ratio (LLR) for the data bit, wherein the determining of the combined representation comprises determining combined distance data representing a sum of distances of a point representing a first binary value of the bit from corresponding constellation points in the first and second constellations at which the bit has the first binary value, the corresponding constellation points representing the same symbol in the different constellations, further comprising performing the determining for a plurality of the corresponding constellation points and selecting minimum combined distance data representing a minimum sum of the distances, performing the determining of the combined distance data for the plurality of corresponding constellation points for a second binary value of the bit and selecting minimum combined distance data representing a minimum sum of the distances, and determining a difference between the minimum combined distance data for the first and second binary values of the bit to determine the LLR.

Another embodiment of the invention provide a decoder including means to implement a method as described above, in accordance with an aspect or embodiment of an aspect of the invention.

A yet further embodiment of the invention provides processor control code to implement the above-described protocols and methods, in particular on a carrier such as a disk, CD- or DVD-ROM, programmed memory such as read-only memory (Firmware), or on a data carrier such as an optical or electrical signal carrier. Code (and/or data) to implement embodiments of the invention preferably comprises code for a hardware description language such as VERILOG (Trade Mark) or VHDL (Very high speed integrated circuit Hardware Description Language) or SystemC, although it may also comprise source, object or executable code in a conventional programming language (interpreted or compiled) such as C, or assembly code, or code for setting up or controlling an ASIC (Application Specific Integrated Circuit) or FPGA (Field Programmable Gate Array). As the skilled person will appreciate such code and/or data may be distributed between a plurality of coupled components in communication with one another.

Further features and advantages of the present invention, as well as the structure and operation of various embodiments thereof, are described in detail below with reference to the accompanying drawings. It is noted that the invention is not limited to the specific embodiments described herein. Such embodiments are presented herein for illustrative purposes only. Additional embodiments will be apparent to persons skilled in the relevant art(s). based on the teachings contained herein.

BRIEF DESCRIPTION OF THE DRAWINGS

The accompanying drawings, which are incorporated herein and form part of the specification, illustrate the embodiments of present invention and, together with the description, further serve to explain the principles of the invention and to enable a person skilled in the relevant art(s) to make and use the invention.

FIGS. 2a to 2d show, respectively, a block diagram of a DCM max-log decoder, a pre-processing module for the decoder of FIG. 2a, an SNR determination module for the decoder of FIG. 2a, and a multi-carrier joint max-log QPSK decoder;

FIG. 4 illustrates, schematically, variation of bit/packet error rate with received signal strength illustrating the effect of the changing relative quantisation noise level shown in FIGS. 3a to 3c;

FIGS. 8a and 8b show, respectively, a block diagram of a PHY hardware implementation for an OFDM UWB transceiver and an example RF front end for the receiver of FIG. 8a.

Figure 1A:
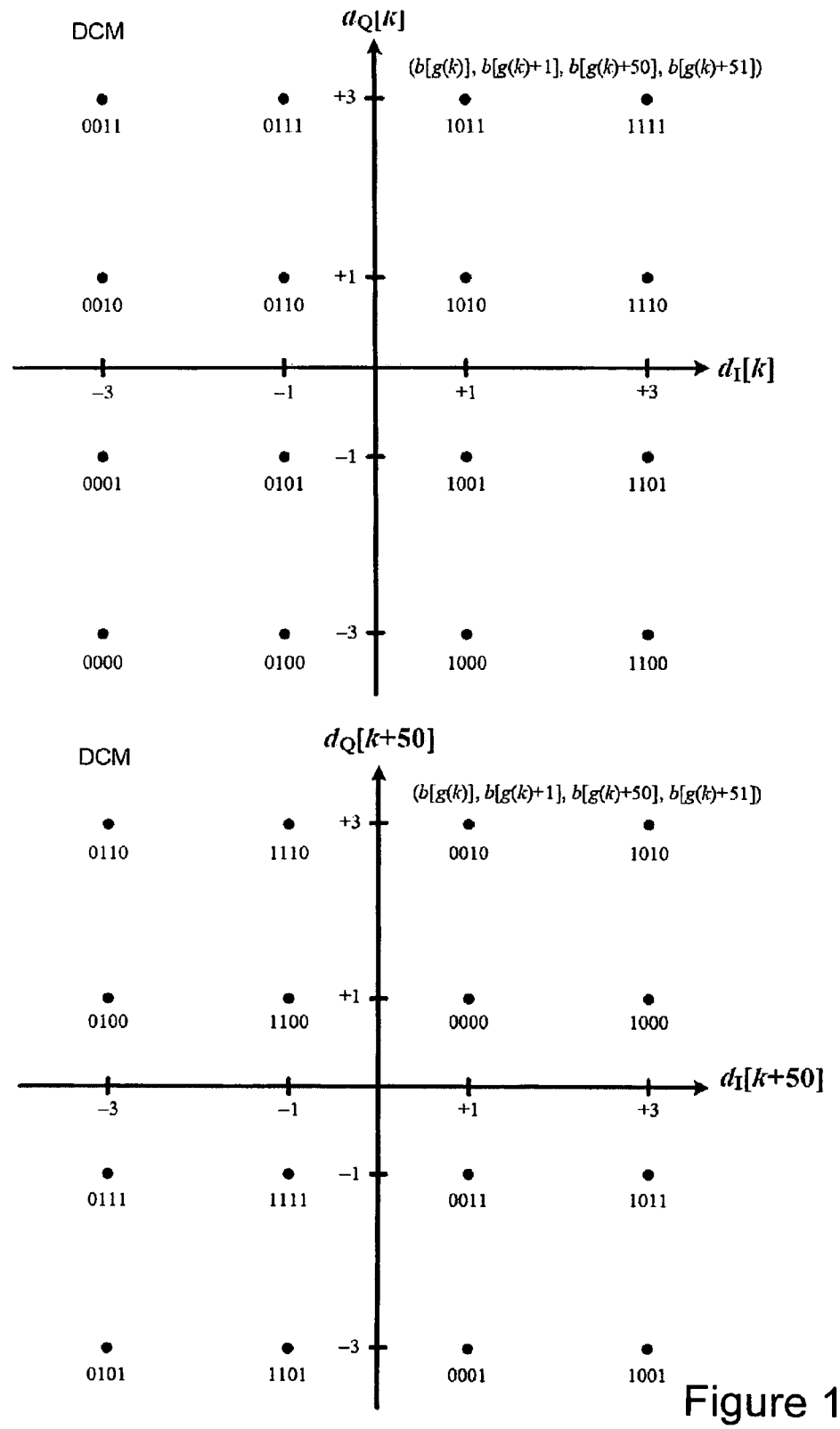
FIGS. 1a and 1b show, respectively, first and second constellations for UWB DCM OFDM, and a schematic illustration of a joint max-log DCM decoding technique.

Further features and advantages of the invention, as well as the structure and operation of various embodiments of the invention, are described in detail below with reference to the accompanying drawings. It is noted that the invention is not limited to the specific embodiments described herein. Such embodiments are presented herein for illustrative purposes only. Additional embodiments will be apparent to persons skilled in the relevant art based on the teachings contained herein.

DETAILED DESCRIPTION

This specification discloses one or more embodiments that incorporate the features of this invention. The disclosed embodiment(s) merely exemplify the invention. The scope of the invention is not limited to the disclosed embodiment(s). The invention is defined by the claims appended hereto.

The embodiment(s) described, and references in the specification to "one embodiment", "an embodiment", "an example embodiment", etc., indicate that the embodiment(s) described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is understood that it is within the knowledge of one skilled in the art to effect such feature, structure, or characteristic in connection with other embodiments whether or not explicitly described.

Embodiments of the invention may be implemented in hardware, firmware, software, or any combination thereof. Embodiments of the invention may also be implemented as instructions stored on a machine-readable medium, which may be read and executed by one or more processors. A machine-readable medium may include any mechanism for storing or transmitting information in a form readable by a machine (e.g., a computing device). For example, a machine-readable medium may include read only memory (ROM); random access memory (RAM); magnetic disk storage media; optical storage media; flash memory devices; electrical, optical, acoustical or other forms of propagated signals (e.g., carrier waves, infrared signals, digital signals, etc.), and others. Further, firmware, software, routines, instructions may be described herein as performing certain actions. However, it should be appreciated that such descriptions are merely for convenience and that such actions in fact result from computing devices, processors, controllers, or other devices executing the firmware, software, routines, instructions, etc.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

If we assume no ISI/ICI and no phase noise then in an OFDM receiver the output of the FFT (Fast Fourier Transform) for each carrier, k, is given by, $$y_k = h_k x_k + n_k$$

Where $x_k$ is the transmitted constellation point, $h_k$ is complex channel response and $n_k$ is complex white Gaussian noise of zero mean and variance $\sigma^2/2$ per dimension. The k subscript will be dropped to simplify the following equations but it should be assumed to be present.

Since interleaving is used on the coded bits prior to the QAM modulator then maximum likelihood decoding would require joint demodulation and convolutional decoding which makes it almost impossible to perform in practice. However the Maximum A-Posterior Sequence Estimation (MAPSE) is possible. In this instance the data is de-mapped into soft-bits, de-interleaved and decoded with a Viterbi decoder. Rather then estimate the most likely symbol sequence it attempts to estimate the most likely bit sequence for a given interleaving function. Using this approach the log-likelihood ratios (LLR) for an M-ary QAM for bit $b_i$, $i=0,1,\ldots M$ on carrier k, is defined as, $$LLR(b_i) = \log\left(\frac{P(b_i = 1 | y)}{P(b_i = 0 | y)}\right)$$

It is this metric that the Viterbi decoder is trying to minimise for a given bit sequence. For any given constellation, separate it into two disjoint sets. One set, S1, is the set of all constellation points for which $b_i=1$ and the other S0 is the set of all points for which $b_i=0$. For example for 16 QAM there will be eight points in S1 and the other eight in S0. The LLR is now, $$LLR(b_i) = \log\left(\frac{\sum_{\alpha \in S1} P(s = \alpha | y)}{\sum_{\beta \in S0} P(s = \beta | y)}\right)$$

Assuming all constellation points are equally likely (which should be true since the data is scrambled) and using Bayes' rule then, $$LLR(b_i) = \log\left(\frac{\sum_{\alpha \in S1} f(y | s = \alpha)}{\sum_{\beta \in S0} f(y | s = \beta)}\right)$$

Now since we assume that the noise is AWGN then, $$f(y | s = \alpha) = \frac{1}{\sigma\sqrt{\pi}} \exp\left(\frac{-1}{\sigma^2}\|y - \alpha h\|^2\right)$$

And so the LLR can be written as, $$LLR(b_i) = \log\left(\frac{\sum_{x_i \in S1} \exp\left(\frac{-1}{\sigma^2}\|y - x_i h\|^2\right)}{\sum_{x_j \in S0} \exp\left(\frac{-1}{\sigma^2}\|y - x_j h\|^2\right)}\right)$$

Note that the LLRs above are the optimum soft decisions in the MAPSE sense for the Viterbi decoder (i.e. we can't do any better). The above equation is difficult to implement in hardware since it requires exponentials and logs and sums over several constellation points. A simplification, known as the max-log approximation can be made. Namely, $$\log\left(\sum_j \exp(-X_j)\right) \approx \max_j(-X_j) = -\min_j(X_j)$$

This simplifies the LLR to, $$LLR(b_i) = \frac{1}{\sigma^2}\left\{\min_{x_j \in S0}\|y - x_j h\|^2 - \min_{x_i \in S1}\|y - x_i h\|^2\right\}$$

The term $(y-x_i h)$ can be re-written as, $h(y/h-x_i)$. This gives an equivalent LLR formulation of, $$LLR(b_i) = \frac{\|h\|^2}{\sigma^2}\left\{\min_{x_j \in S0}\left\|\frac{y}{h} - x_j\right\|^2 - \min_{x_i \in S1}\left\|\frac{y}{h} - x_i\right\|^2\right\}$$

This form implies that the received signal, y, is first corrected by the channel estimate h. A soft decision is then generated by comparing to nearest constellation points and then this value is weighted by the SNR of the carrier.

QPSK Modes

In the "MultiBand OFDM Physical Layer Specification, the 53.3 Mbps and 80 Mbps rates use QPSK for the data carriers but in addition the same information is carried on 4 separate carriers. Thus in this case we use LLRs for the bits given by, $$LLR(b_i) = \log\left(\frac{\sum_{x_i \in S1} \exp\left(\sum_{k=1}^{4} \frac{-|h_k|^2}{\sigma_k^2}\left\|\frac{y_k}{h_k} - x_i\right\|^2\right)}{\sum_{x_{ji} \in S1} \exp\left(\sum_{k=1}^{4} \frac{-|h_k|^2}{\sigma_k^2}\left\|\frac{y_k}{h_k} - x_j\right\|^2\right)}\right)$$

Using the max-log approximation this reduces to, $$LLR(b_n) =$$
$$\min_{x_j \in S0}(\rho_1\|r_1 - x_j\|^2 + \rho_2\|r_2 - x_j\|^2 + \rho_3\|r_3 - x_j\|^2 + \rho_4\|r_4 - x_j\|^2) -$$
$$\min_{x_i \in S1}(\rho_1\|r_1 - x_i\|^2 + \rho_2\|r_2 - x_i\|^2 + \rho_3\|r_3 - x_i\|^2 + \rho_4\|r_4 - x_i\|^2)$$

Note that:

$r_1 = y_1/h_1$ is the corrected constellation point of the $1^{st}$ QPSK carrier where $y_1$ is the FFT output and $h_1$ is the channel estimate.

$r_2 = y_2/h_2$ is the corresponding constellation point of the corresponding $2^{nd}$ QPSK carrier and so on.

Here $\rho_n = |h_n|^2/\sigma_n^2$ is the SNR of the nth carrier (or channel power if SNR not available)

The QPSK encoding table is as given below, with a normalisation factor of $1/\sqrt{2}$.

| Input Bit (b[2k], b[2k + 1]) | I-out | Q-out |
|---|---|---|
| 00 | −1 | −1 |
| 01 | −1 | 1 |
| 10 | 1 | −1 |
| 11 | 1 | 1 |

Note that each bit is constant in the I or Q direction. This means that we can separate real, $\Re$, and imaginary, $\Im$, parts without any loss in generality, (that is, there is no loss in the possibilities represented). This simplifies the resulting LLR to, $$LLR(b_0) = \sum_{k=1}^{4} \rho_k \left(\Re(r_k) + \frac{1}{\sqrt{2}}\right)^2 - \rho_k \left(\Re(r_k) - \frac{1}{\sqrt{2}}\right)^2$$
$$= \frac{4}{\sqrt{2}} (\rho_1 \Re(r_1) + \rho_2 \Re(r_2) + \rho_3 \Re(r_3) + \rho_4 \Re(r_4))$$

$$LLR(b_1) = \sum_{k=1}^{4} \rho_k \left(\Im(r_k) + \frac{1}{\sqrt{2}}\right)^2 - \rho_k \left(\Im(r_k) - \frac{1}{\sqrt{2}}\right)^2$$
$$= \frac{4}{\sqrt{2}} (\rho_1 \Im(r_1) + \rho_2 \Im(r_2) + \rho_3 \Im(r_3) + \rho_4 \Im(r_4))$$

Note that the above means that the soft decision can be generated individually for each carrier and then added to generate the overall LLR for a bit spread across 4 carriers. The other QPSK rates use the same principle except that only two carriers are used instead of four.

Note that here $$\rho_n r_n = \frac{|h_n|^2}{\sigma_n^2} \cdot \frac{y_n}{h_n} = \frac{y_n h_n^*}{\sigma_n^2}$$

where $h_i$ is the channel estimate and $y_i$ is the FFT output (optionally $\sigma_n^2$ may be omitted, that is set to unity). This form of the expression removes the need to perform a vector divide to generate $$r_i = \frac{y_i}{h_i},$$

and allows the final LLR expressions to be rewritten as:

$$LLR(b_0) = \frac{4}{\sqrt{2}} \Re\left(\frac{y_1 h_1^*}{\sigma_1^2} + \frac{y_2 h_2^*}{\sigma_2^2} + \frac{y_3 h_3^*}{\sigma_3^2} + \frac{y_4 h_4^*}{\sigma_4^2}\right)$$

$$LLR(b_1) = \frac{4}{\sqrt{2}} \Im\left(\frac{y_1 h_1^*}{\sigma_1^2} + \frac{y_2 h_2^*}{\sigma_2^2} + \frac{y_3 h_3^*}{\sigma_3^2} + \frac{y_4 h_4^*}{\sigma_4^2}\right).$$

Hence for QSPK the soft decisions are just the real or imaginary part of the corrected constellation weighted by their respective SNR, albeit preferably expressed in the above form (in which equalised constellation points are not explicitly determined).

It can be seen from the above that rather than separately equalising the received signal data to determine a corrected received signal value (y/h) which may be plotted on a constellation diagram and then demodulating the corrected received signal value by, say, determining a nearest constellation point, in preferred embodiments of our technique we do not generate a constellation but instead work with modified or intermediate signal values which, in particular, do not require a division by a channel estimate.

OPSK Mode SNR Calculation

The expression for SNR is given by $$SNR_{dB} = -10 \cdot \log_{10}\left(\frac{\sum \text{noise\_power}}{\sum \text{signal\_power}}\right)$$

QPSK modulation uses up to four carriers which contribute to joint the encoding quality. The resulting expression for the joint SNR is given by:

$$SNR_{dB}(r_1, r_2, r_3, r_4) = -10 \cdot \log_{10}\left(\frac{\sum \rho_1 \|r_1 - x_d\|^2 + \rho_2 \|r_2 - x_d\|^2 + \rho_3 \|r_3 - x_d\|^2 + \rho_4 \|r_4 - x_d\|^2}{\sum \rho_1 + \rho_2 + \rho_3 + \rho_4}\right)$$

Given the normalisation $\|r_n\|^2 = \|x_d\|^2 = 1$ the above expression can be rewritten in terms of the LLR expressions:

$$SNR_{dB}(y_1, y_2, y_3, y_4) = -10 \cdot \log_{10}\left(\frac{\sum \rho_1 + \rho_2 + \rho_3 + \rho_4 + \rho_1 \|r_1\|^2 + \rho_2 \|r_2\|^2 + \rho_3 \|r_3\|^2 + \rho_4 \|r_4\|^2 - \frac{1}{2\sqrt{2}} \text{ABS}(LLR(b_0)) - \frac{1}{2\sqrt{2}} \text{ABS}(LLR(b_1))}{\sum \rho_1 + \rho_2 + \rho_3 + \rho_4}\right)$$

It can then be seen that the SNR is a function of $LLR(b_0)$ and $LLR(b_1)$, more specifically of a difference between absolute values of $LLR(b_0)$ and $LLR(b_1)$, together with an SNR term ($\rho r^2$), summed over carriers.

DCM Modes

For DCM modes the situation is more complex. In this instance 4 bits are transmitted on two separate 16 QAM carriers with different mappings. The fact that the mappings are different and that the reliability of each bit in a single 16 QAM constellation is not equally weighted means that we cannot just demodulate the bits separately (as in the QPSK case) but must perform a joint decode. In this instance we must treat the received vectors for a DCM carrier pair as a 4-dimensional point and find the LLR in this 4 dimensional space.

The LLR for the bit-i is given by, $$LLR(b_i) = \log\left(\frac{\sum_{x_i \in S1} \exp\left(\frac{-|h_1|^2}{\sigma_1^2}\left\|\frac{y_1}{h_1} - x_i^1\right\|^2 + \frac{-|h_2|^2}{\sigma_2^2}\left\|\frac{y_2}{h_2} - x_i^2\right\|^2\right)}{\sum_{x_j \in S0} \exp\left(\frac{-|h_1|^2}{\sigma_1^2}\left\|\frac{y_1}{h_1} - x_j^1\right\|^2 + \frac{-|h_2|^2}{\sigma_2^2}\left\|\frac{y_2}{h_2} - x_j^2\right\|^2\right)}\right)$$

Using the max-log approximation this reduces to, $$LLR(b_n) = \min_{x_j \in S0}\left(\rho_1\|r_1 - x_j^1\|^2 + \rho_2\|r_2 - x_j^2\|^2\right) - \min_{x_i \in S1}\left(\rho_1\|r_1 - x_i^1\|^2 + \rho_2\|r_2 - x_i^2\|^2\right)$$

Where $r_1 = y_1/h_1$ identifies the corrected constellation point on the $1^{st}$ DCM carrier and $r_2 = y_2/h_2$ is the corresponding constellation point of the corresponding $2^{nd}$ DCM carrier. Here $\rho_n = |h_n|^2/\sigma_n^2$ is the SNR of the nth carrier (or channel power if SNR not available) and $x_n^1$ and $x_n^2$ are corresponding Tx constellation points for each of the two DCM carriers. Note that for DCM each bit is constant in the I or Q direction. This means that we can separate real, $\Re$, and imaginary, $\Im$, parts without any loss in generality (as shown below). For bit 0 this simplifies the resulting LLR to, $$LLR(b_0) = \min\begin{pmatrix}\left(\rho_1\left(\Re(r_1) + \frac{1}{\sqrt{10}}\right)^2 + \rho_2\left(\Re(r_2) + \frac{3}{\sqrt{10}}\right)^2\right) \\ \left(\rho_1\left(\Re(r_1) + \frac{3}{\sqrt{10}}\right)^2 + \rho_2\left(\Re(r_2) - \frac{1}{\sqrt{10}}\right)^2\right)\end{pmatrix} - \min\begin{pmatrix}\left(\rho_1\left(\Re(r_1) - \frac{1}{\sqrt{10}}\right)^2 + \rho_2\left(\Re(r_2) - \frac{3}{\sqrt{10}}\right)^2\right) \\ \left(\rho_1\left(\Re(r_1) - \frac{3}{\sqrt{10}}\right)^2 + \rho_2\left(\Re(r_2) + \frac{1}{\sqrt{10}}\right)^2\right)\end{pmatrix}$$

Consider the first (min) term: Referring back to FIG. 1a and the DCM constellation table, the real (I) values for $x_j=0$ are −3 and −1 in the first constellation and −3 and +1 in the second constellation (also noting the $1/\sqrt{10}$ normalisation factor and the minus sign before $x_j$).

$$LLR(b_0) = \min\begin{pmatrix}\left(\rho_1\left(\frac{2}{\sqrt{10}}\Re(r_1) + \frac{1}{10}\right) + \rho_2\left(\frac{6}{\sqrt{10}}\Re(r_2) + \frac{9}{10}\right)\right) \\ \left(\rho_1\left(\frac{6}{\sqrt{10}}\Re(r_1) + \frac{9}{10}\right) + \rho_2\left(\frac{-2}{\sqrt{10}}\Re(r_2) + \frac{1}{10}\right)\right)\end{pmatrix} - \min\begin{pmatrix}\left(\rho_1\left(\frac{-2}{\sqrt{10}}\Re(r_1) + \frac{1}{10}\right) + \rho_2\left(\frac{-6}{\sqrt{10}}\Re(r_2) + \frac{9}{10}\right)\right) \\ \left(\rho_1\left(\frac{-6}{\sqrt{10}}\Re(r_1) + \frac{9}{10}\right)^2 + \rho_2\left(\frac{2}{\sqrt{10}}\Re(r_2) + \frac{1}{10}\right)\right)\end{pmatrix}$$

Figure 1B:
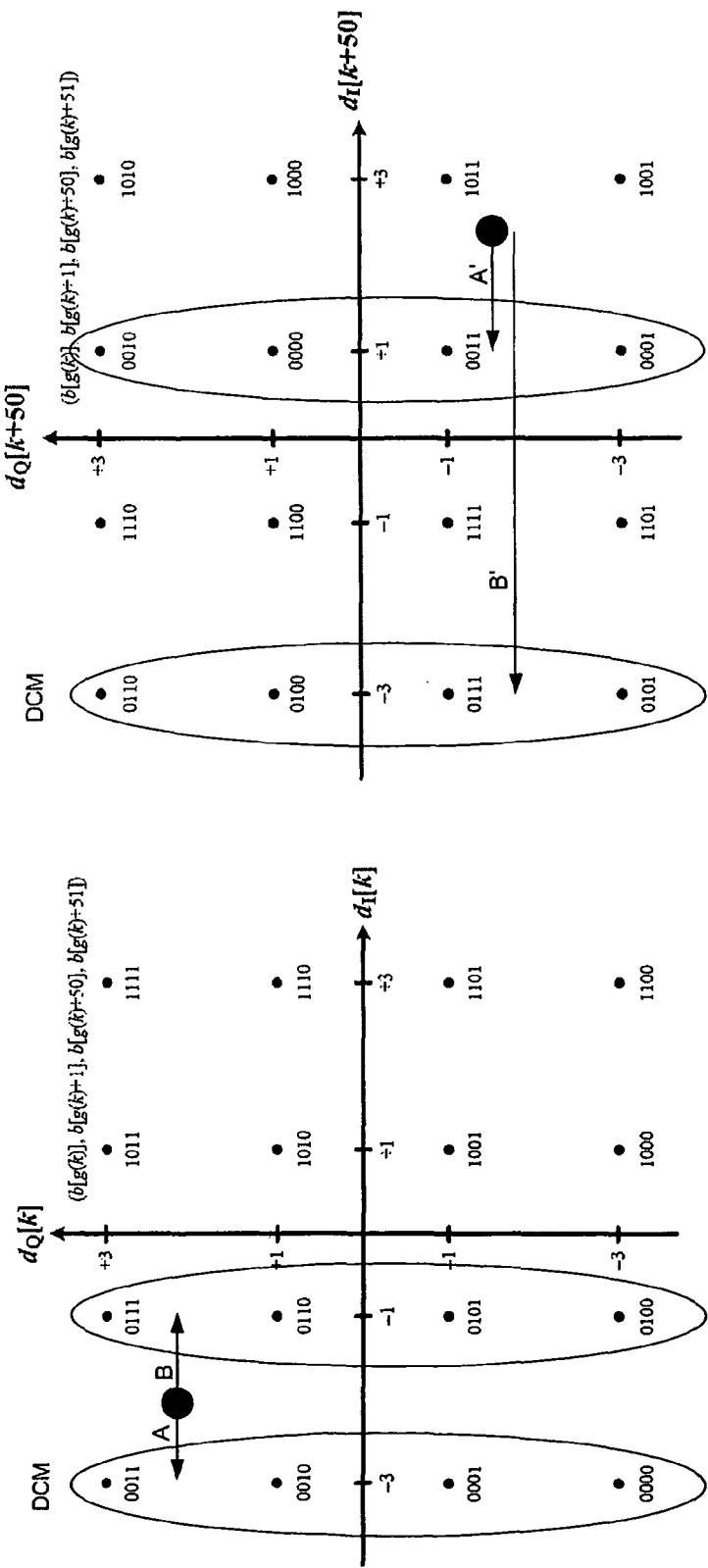

Consider now the example of FIG. 1b. The ringed columns show all values of $x_0=0$; in each constellation only two virtual columns have zeros. Thus the distance to $x_0=0$ can be measured in one dimension. If the dark spot represents and equa-lised received signal value the left hand (min) term in the above equation can be seen to be $$\min\begin{pmatrix}\rho_1 A + \rho_2 A' \\ \rho_1 B + \rho_2 B'\end{pmatrix}$$

The right hand min ( ) term corresponds for $x_0=1$. In practice, however (as noted previously and explained further below) the position of an equalised received signal value need not be determined explicitly.

Note that in the above equation $\rho_1 \Re$, $(r_1)^2$ and $\rho_2 \Re$, $(r_2)^2$ will always cancel. In addition as far as finding the min of both comparisons these terms are present in both and so are not required. This gives, A similar analysis can be performed for the other 3 bits of the DCM constellation. Bit 2 is the same as bit 0 except that the real parts of the received points are replaced by the imaginary parts. The LLR for the remaining bits are shown below, $$LLR(b_1) = \min\begin{pmatrix}\rho_1\left(\frac{6}{\sqrt{10}}\Re(r_1)+\frac{9}{10}\right)+\rho_2\left(\frac{-2}{\sqrt{10}}\Re(r_2)+\frac{1}{10}\right)\\ \rho_1\left(\frac{-2}{\sqrt{10}}\Re(r_1)+\frac{1}{10}\right)+\rho_2\left(\frac{-6}{\sqrt{10}}\Re(r_2)+\frac{9}{10}\right)\end{pmatrix} - \min\begin{pmatrix}\rho_1\left(\frac{2}{\sqrt{10}}\Re(r_1)+\frac{1}{10}\right)+\rho_2\left(\frac{6}{\sqrt{10}}\Re(r_2)+\frac{9}{10}\right)\\ \rho_1\left(\frac{-6}{\sqrt{10}}\Re(r_1)+\frac{9}{10}\right)^2+\rho_2\left(\frac{2}{\sqrt{10}}\Re(r_2)+\frac{1}{10}\right)\end{pmatrix}$$

$$LLR(b_2) = \min\begin{pmatrix}\rho_1\left(\frac{2}{\sqrt{10}}\Im(r_1)+\frac{1}{10}\right)+\rho_2\left(\frac{6}{\sqrt{10}}\Im(r_2)+\frac{9}{10}\right)\\ \rho_1\left(\frac{6}{\sqrt{10}}\Im(r_1)+\frac{9}{10}\right)+\rho_2\left(\frac{-2}{\sqrt{10}}\Im(r_2)+\frac{1}{10}\right)\end{pmatrix} - \min\begin{pmatrix}\rho_1\left(\frac{-2}{\sqrt{10}}\Im(r_1)+\frac{1}{10}\right)+\rho_2\left(\frac{-6}{\sqrt{10}}\Im(r_2)+\frac{9}{10}\right)\\ \rho_1\left(\frac{-6}{\sqrt{10}}\Im(r_1)+\frac{9}{10}\right)^2+\rho_2\left(\frac{2}{\sqrt{10}}\Im(r_2)+\frac{1}{10}\right)\end{pmatrix}$$

$$LLR(b_3) = \min\begin{pmatrix}\rho_1\left(\frac{6}{\sqrt{10}}\Im(r_1)+\frac{9}{10}\right)+\rho_2\left(\frac{-2}{\sqrt{10}}\Im(r_2)+\frac{1}{10}\right)\\ \rho_1\left(\frac{-2}{\sqrt{10}}\Im(r_1)+\frac{1}{10}\right)+\rho_2\left(\frac{-6}{\sqrt{10}}\Im(r_2)+\frac{9}{10}\right)\end{pmatrix} - \min\begin{pmatrix}\rho_1\left(\frac{2}{\sqrt{10}}\Im(r_1)+\frac{1}{10}\right)+\rho_2\left(\frac{6}{\sqrt{10}}\Im(r_2)+\frac{9}{10}\right)\\ \rho_1\left(\frac{-6}{\sqrt{10}}\Im(r_1)+\frac{9}{10}\right)^2+\rho_2\left(\frac{2}{\sqrt{10}}\Im(r_2)+\frac{1}{10}\right)\end{pmatrix}$$

Figure 2A:
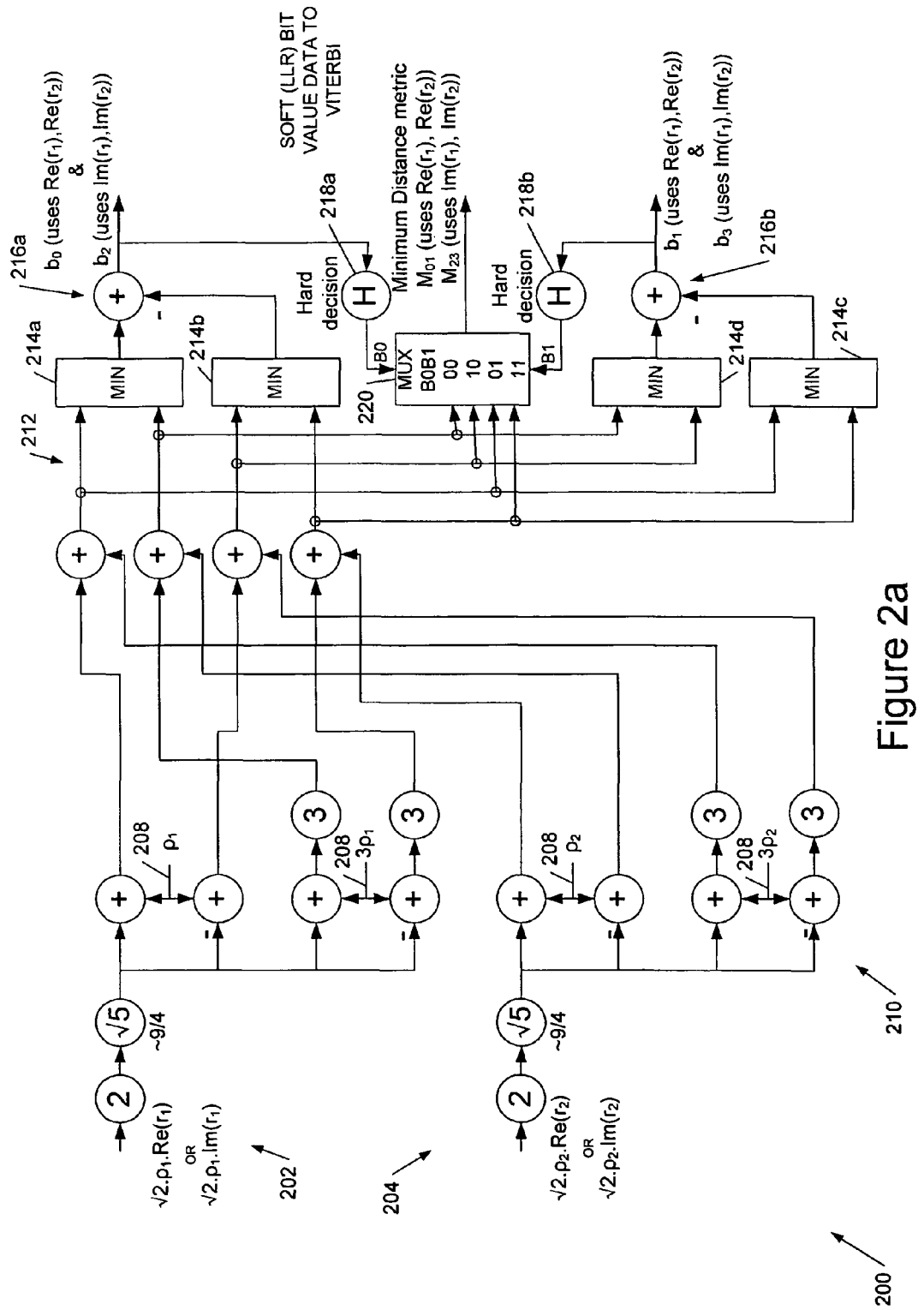

By factoring such that $2\sqrt{10}\rho_i\Re(r_i)$ is present gives the final form of the DCM decoder as shown in FIG. 2a:

$$LLR(b_0) = \frac{1}{10}\min\begin{pmatrix}2\sqrt{10}\,(\rho_1\Re(r_1)+3\rho_2\Re(r_2))+(\rho_1+9\rho_2)\\ 2\sqrt{10}\,(3\rho_1\Re(r_1)-\rho_2\Re(r_2))+(9\rho_1+\rho_2)\end{pmatrix} - \frac{1}{10}\min\begin{pmatrix}2\sqrt{10}\,(-\rho_1\Re(r_1)-3\rho_2\Re(r_2))+(\rho_1+9\rho_2)\\ 2\sqrt{10}\,(-3\rho_1\Re(r_1)+\rho_2\Re(r_2))+(9\rho_1+\rho_2)\end{pmatrix}$$

This form is still optimum in the max-log sense of MAPSE. Note that $\rho_i\Re,(r_i)=\Re,(y_ih_i^*)$ where $h_i$ is the channel estimate and $y_i$ is the FFT output (omitting the $\sigma^2$) This form of the expression removes the need to perform a vector divide to generate $$r_i = \frac{y_i}{h_i}$$

DCM Mode SNR Calculation

The expression for SNR is given by $$SNR_{dB} = -10\cdot\log_{10}\left(\sum\frac{\text{noise\_power}}{\text{signal\_power}}\right)$$

DCM modulation uses two carriers which contribute jointly to the encoding quality. As a result the expression for the SNR of a DCM joint carrier pair is as follows:

$$SNR_{dB}(r_1,r_2) = -10\cdot\log_{10}\left(\sum\frac{\rho_1\|r_1-x_d^1\|^2+\rho_2\|r_2-x_d^2\|^2}{\rho_1+\rho_2}\right)$$

Where $x_d^n$ is the vector associated with the hard-decision output of the DCM decoder for carrier n. The sum is performed over all symbols in the frame.

The numerator of the above expression is identical to the distance function used by the DCM decoder. Some rearranging achieves considerable simplification:

$$SNR_{dB}(r_1,r_2) = -10\cdot\log_{10}\left(\sum\frac{\rho_1(\Re(r_1-x_d^1)^2+\Im(r_1-x_d^1)^2)+\rho_2(\Re(r_2-x_d^2)^2+\Im(r_2-x_d^2)^2)}{\rho_1+\rho_2}\right)$$

$$SNR_{dB}(r_1,r_2) = -10\cdot\log_{10}\left(\sum\frac{\rho_1(\Re(r_1-x_d^1))^2+\rho_2(\Re(r_2-x_d^2))^2+\rho_1(\Im(r_1-x_d^1))^2+\rho_2(\Im(r_2-x_d^2))^2}{\rho_1+\rho_2}\right)$$

$$SNR_{dB}(r_1,r_2) = -10\cdot\log_{10}\left(\sum\frac{\begin{array}{l}\rho_1(\Re(r_1)^2-2\Re(r_1)\Re(x_d^1)+\Re(x_d^1)^2)+\rho_2(\Re(r_2)^2-2\Re(r_2)\Re(x_d^2)+\Re(x_d^2)^2)+\\ \rho_1(\Im(r_1)^2-2\Im(r_1)\Im(x_d^1)+\Im(x_d^1)^2)+\rho_2(\Im(r_2)^2-2\Im(r_2)\Im(x_d^2)+\Im(x_d^2)^2)\end{array}}{\rho_1+\rho_2}\right)$$

$$SNR_{dB}(r_1,r_2) = -10\cdot\log_{10}\left(\sum\frac{\begin{array}{l}\rho_1(\Re(r_1)^2+\Im(r_1)^2)+\rho_1\left(-2\Re(r_1)\Re(x_d^1)+\Re(x_d^1)^2\right)+\\ \rho_2\left(-2\Re(r_2)\Re(x_d^2)+\Re(x_d^2)^2\right)+\rho_2(\Re(r_2)^2+\Im(r_2)^2)+\\ \rho_1\left(-2\Im(r_1)\Im(x_d^1)+\Im(x_d^1)^2\right)+\rho_2\left(-2\Im(r_2)\Im(x_d^2)+\Im(x_d^2)^2\right)\end{array}}{\rho_1+\rho_2}\right)$$

-continued $$SNR_{dB}(r_1, r_2) = -10 \cdot \log_{10}\left(\sum \frac{\begin{array}{c}\rho_1\|r_1\|^2 + \rho_1\left(-2\Re(r_1)\Re(x_d^1) + \Re(x_d^1)^2\right) + \\ \rho_2\left(-2\Re(r_2)\Re(x_d^2) + \Re(x_d^2)^2\right) + \rho_2\|r_2\|^2 + \\ \rho_1\left(-2\Im(r_1)\Im(x_d^1) + \Im(x_d^1)^2\right) + \rho_2\left(-2\Im(r_2)\Im(x_d^2) + \Im(x_d^2)^2\right)\end{array}}{\rho_1 + \rho_2}\right)$$

Given $$\rho_1 = \frac{\|h_1\|^2}{\sigma_1^2} \text{ and } r_1 = \frac{y_1}{h_1}$$

where $h_1$ is the channel estimate and $y_1$ is the FFT output gives:

$$SNR_{dB}(r_1, r_2) = -10 \cdot \log_{10}\left(\sum \frac{\begin{array}{c}\|y_1\|^2 - 2\Re(y_1 h_1^*)\Re(x_d^1) + \|h_1\|^2\Re(x_d^1)^2 - 2\Re(y_2 h_2^*)\Re(x_d^2) + \|h_2\|^2\Re(x_d^2)^2 + \\ \|y_2\|^2 - 2\Im(y_1 h_1^*)\Im(x_d^1) + \|h_1\|^2\Im(x_d^1)^2 - 2\Im(y_2 h_2^*)\Im(x_d^2) + \|h_2\|^2\Im(x_d^2)^2\end{array}}{(\rho_1 + \rho_2)}\right)$$

For the hard-decision $b_0=0$ $b_1=0$ $b_2=0$ $b_3=0$ the SNR is given by:

$$SNR_{dB}\left(\frac{-3+i}{\sqrt{10}}, \frac{-3+i}{\sqrt{10}}\right) = -10 \cdot \log_{10}\left(\sum \frac{\begin{array}{c}10\rho_1\|r_1\|^2 + \left(-6\sqrt{10}\,\rho_1\Re(r_1) + 9\rho_1 - 6\sqrt{10}\,\rho_2\Re(r_2) + 9\rho_2\right) + \\ 10\rho_2\|r_2\|^2 + \left(-2\sqrt{10}\,\rho_1\Im(r_1) + \rho_1 - 2\sqrt{10}\,\rho_2\Im(r_2) + \rho_2\right)\end{array}}{10(\rho_1 + \rho_2)}\right)$$

Each of the terms in the above equation is already computed when calculating the DCM soft-decision metric. Based on the hard-decision output of the DCM demodulator the appropriate terms can be selected. The general expression for SNR thus becomes:

$$SNR_{dB}(r_1, r_2) = -10 \cdot \log_{10}\left(\sum \frac{10 \cdot (\rho_1\|r_1\|^2 + \rho_2\|r_2\|^2) + m_{01} + m_{23}}{10 \cdot (\rho_1 + \rho_2)}\right)$$

Where $m_{01}$ and $m_{23}$ are the distance metrics calculated in FIG. 1 associated with the hard-decision decode of $b_0, b_1$ and $b_2, b_3$ respectively. In the above equation, broadly speaking the two distance terms (m), one from each of the real and imaginary components, represent a squared error component of the joint SNR.

Thus although the optimum soft decisions for use by the Viterbi are not easily implementable, by using a max-log approximation it is possible to derive nearly optimum soft decisions that are implementable for both QPSK and DCM modes of operation. An implementation of such a near-optimum DCM decoder 200 is shown in FIG. 2a.

Referring to FIG. 2a, first and second inputs 202, 204 receive pre-processed data generated from received signal data and channel estimate data, preferably combined with noise level data, from a pre-processor 206 of the general type shown in FIG. 2b. Other inputs 208 receive values of ρ which broadly defines a signal power or signal-to-noise ratio for a carrier. Arithmetic processing blocks 210 are coupled to inputs 202, 204, 208 to implement the above-described DCM LLR calculations; the skilled person will appreciate that other configurations than those in FIG. 2a are possible. The outputs 212 of the arithmetic processing blocks 210 comprise the terms given above for DCM OFDM demodulation minimum values of which are to be selected (that is the terms within the brackets in min ( )). As illustrated; these separate implementations may comprise serial or parallel implementations of separate and/or shared hardware. A selection of the minimum terms is performed by two pairs of selectors 214a, b and 214c, d. Bit LLR values are determined by calculating a difference between the selected minimum values using summers 216a, b. A hard decision on the most likely bit values is made on the LLR data by hard decision unit 218a, b and these provide inputs to a multiplexer 220 which selects from amongst outputs 212 to provide a minimum distance metric (one for each of the real and imaginary components processed).

FIG. 2c shows an SNR determination module 222 configured to implement the above-described DCM mode SNR calculation and to provide an SNR output 224. This SNR output may be employed to provide per carrier SNR data to pre-processor 206 to provide a feedback loop to obtain a better estimate of the SNR associated with a particular carrier, and hence of an associated bit LLR (the confidence in the bit value decreasing with decreasing SNR for the carrier or pair of DCM carriers).

FIG. 2d illustrates, schematically, a decoder 250 to implement the above-described 4-carrier QPSK mode signal decoding.

Noise

Figure 3A:
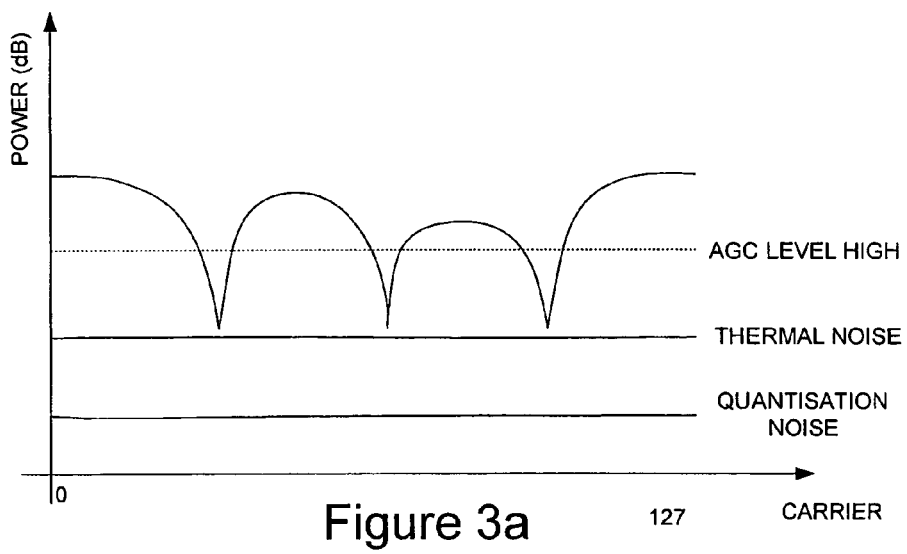
FIGS. 3a to 3c illustrate the relative positions of thermal and quantisation noise levels as received signal strength varies (not to scale)
Figure 3B:
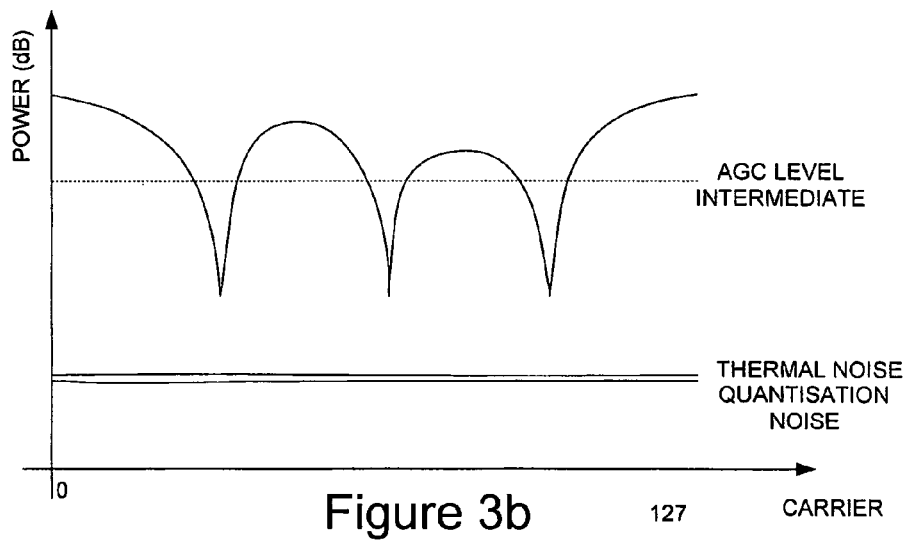
Figure 3C:
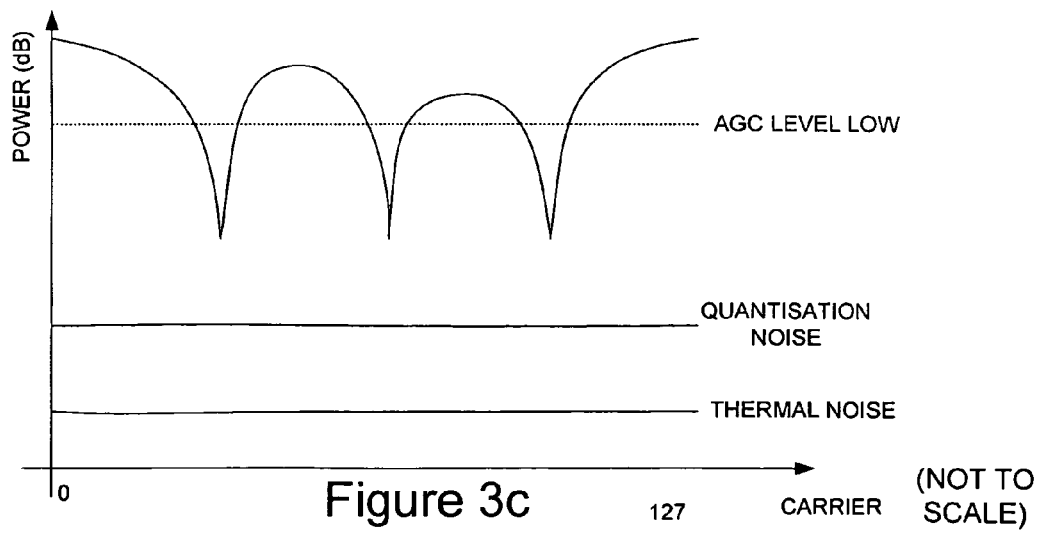

Referring now to FIGS. 3a to 3c, these illustrate, schematically, the effect of a changing signal level on the relative importance of thermal noise and quantisation noise (the illustrations are not to scale). It can be seen that for larger received signals the quantisation noise is relatively more important. In a receiver the designer will know where the thermal noise should be (the precise value is not important) and thus the AGC level can be used as an estimate of the thermal noise $\sigma_{n.T}^2$.

Referring now to FIG. 4, this shows the effect of quantisation noise on bit or packet error rate as the received signal level is varied. As can be seen, unexpectedly the result of the quantisation noise is that with apparently good signals the bit or packet error rate is higher than expected.

Referring back to FIG. 3, the distance to the quantisation noise $\sigma_{n.Q}^2$ is substantially fixed. Thus the quantisation noise $\sigma_{n.Q}^2$ may be modelled by, say, a register value and taken into account when determining a signal-to-noise ratio. More particularly, in the above-described expressions the noise $\sigma_n^2$ may be replaced by:

$$\sigma_n^2 = \sigma_{n.T}^2 + \sigma_{n.Q}^2.$$

This helps to correct for the effects of quantisation noise, and hence further improve the LLR. Optionally a level of interference may also be included in the above expression for $\sigma_n^2$.

DCM Decoding Summary

We have thus described a method of decoding a DCM (dual carrier modulation) modulated OFDM signal, the method comprising: inputting first received signal data representing modulation of a multibit data symbol onto a first carrier of said OFDM signal using a first constellation; inputting second received signal data representing modulation of said multibit data symbol onto a second, different carrier of said OFDM signal using a second, different constellation; determining a combined representation of said first and second received signal data, said combined representation representing a combination of a distance of a point representing a bit value of said multibit data from a constellation point in each of said different constellations; and determining a decoded value of a data bit of said multibit data using said combined representation.

Employing a combined distance representation enables the two different constellations on the different OFDM carriers to be jointly decoded, thus providing a significant improvement in performance. Broadly speaking the combined distance is a sum of distances in the different first and second constellations; this is used to determine a soft, more particularly log likelihood ratio (LLR) value of a decoded data bit. Thus preferably first and second binary values of the bit, for example 1 and 0, are considered and for each binary value a summed distance is determined representing a distance of a received signal for the bit to corresponding correlation points in the different constellations. More particularly a set of such summed distances is determined and the minimum summed distance is selected. The difference between the two minimum summed distances for the two different bit values is then used to determine the log likelihood ratio for the bit.

Corresponding constellation points in the two different constellations comprise points representing the same symbol in the two different constellations, but preferably the distance comprises a one-dimensional distance in the I or Q (real or imaginary) direction since a full Euclidean distance need not be determined. This can be understood by inspection of FIG. 1a. Consider, for example, the symbol point for 0110. This can be found in the second column of the upper constellation and the first column of the lower constellation, but in each case each entry in each of the columns has a zero in the first bit position and therefore, in this example, only the distance along the I axis need be determined. This simplifies the distance determination.

Further, although the method can determine combined distance data representing a sum of distances as described above, preferably this is not done by determining a point on the constellation representing a value of the received signal: The calculation can be further simplified by, counter-intuitively, combining the mathematics involved in equalisation and demodulation without explicitly deriving a value which would correspond to an equalised received signal value (and hence which could be plotted on a constellation diagram). Instead a combination of a received signal value and a channel estimate is employed in distance determination but without dividing the received signal by the channel estimate.

Referring again to the basic equation for the LLRs given above, this can be expressed in two equivalent forms, as shown below:

$$LLR(b_i) = \frac{1}{\sigma^2} \left\{ \min_{x_j \in S0} \|y - x_j h\|^2 - \min_{x_i \in S1} \|y - x_i h\|^2 \right\}$$

OR $$LLR(b_i) = \frac{\|h\|^2}{\sigma^2} \left\{ \min_{x_j \in S0} \left\|\frac{y}{h} - x_j\right\|^2 - \min_{x_i \in S1} \left\|\frac{y}{h} - x_i\right\|^2 \right\}$$

With the latter form each sub-carrier out of the FFT is first corrected then de-mapped into soft-bits which are then weighted by the SNR of the sub-carrier from which the bit came. The former form does not require channel correction or SNR weighting. Instead the sub-carrier out of the FFT is compared against a channel deformed version of the expected constellation points. Similar reasoning can be employed with MCDM decoding, described below.

The skilled person will appreciate that in a DCM decoder as described above, and in an MCDM decoder as described below, the calculations performed may be based upon either form of the LLR. Thus embodiments of the invention are not restricted to the precise formulation of the decoder as described later but may instead use a different form of the decoder depending, for example, upon whether or not each subcarrier from the FFT stage is corrected, as well as on other implementation details as described later.

MCDM Decoding
Modulation:

As previously described, the modulation operation can be summarized as:
1. convert 8 bits into two 16-QAM grey-coded constellations, x1 and x2
2. constellations to send, [y1 y2]'=A[x1 x2]' where A=(1/sqrt(17))*[4 1;1 −4]
3. send y1 and y2 on two separate subcarriers.

Conceptually, each carrier encodes 4 bits, and then adds to this the other carrier at 1/16$^{th}$ of the energy. Thus, each of the 16 constellation points turns into a tiny cluster of 16 points, representing the constellation of the other paired carrier.

The QAM constellation, which is used for the channel estimate, has a coordinate value of ±1/√2. The 16QAM constellation has coodinate values that are ±1/√10 and 3/√10. Any difference in rounding error between this and the channel estimate at the input to the iFFT is important, as this difference comes up as a permanent addition to EVM (Error Vector Magnitude). For instance, for QAM and 16QAM good values to use are 38 and 17 given, say, a 7-bit (S2.4) input to the iFFT stage. Consider, for example the Matlab (Trade Mark) list of values for sqrt(5)*(1:20); item 17 is 38.013, and has the smallest fractional part of the listed values.

For MDCM there are 16 possible coordinate values:

$$(+/-)\frac{(4\,or\,12)}{(10\times 17)}(+/-1)\frac{(1\,or\,3)}{\sqrt{10\times 17}} = (+/-)\frac{(1\,or\,3\,or\,5\,or\,7\,or\,9\,or\,11\,or\,13\,or\,15)}{\sqrt{170}}$$

These are the 256 QAM constellation points.

For an S2.4 iFFT input these are best coded as 4×(1,3, 5 ... 15), up to a maximum range of ±60 (7 bits, approx ±64). The best corresponding QPSK value for the channel estimate is 37. Ideally this value would be 36.878. This value keeps the matrix regular but may not minimise the average error compared to the channel estimate. Further routine experimentation may be employed to determine the optimum for EVM purposes.

Demodulation:

Referring again to the equation used to generate MDCM modulation values, $$\begin{pmatrix} d[k] \\ d[k+50] \end{pmatrix} = \begin{pmatrix} 4 & 1 \\ 1 & -4 \end{pmatrix} \times \begin{pmatrix} x_a \\ x_b \end{pmatrix} \times 1/\sqrt{170}$$

where $x_a$ and $x_b$ are Gray coded 16 QAM constellation points selected by the input bits $b[8\times k], \ldots, b[8\times k+3]$, it can be seen that the Gray coded value used has a real part determined by selection bits 2 and 3, and imaginary part determined by bits 0 and 1. Thus it can be seen that bits 0,1,4,5 are encoded on $Im(d[k])$ and $Im(d[k+50])$, and bits 2,3,6,7 are coded on bits $Re(d[k])$ and $Re(d[k+50])$, as follows:

$Re(d[k]) = 4 \times g(b_2, b_3) + g(b_6, b_7)$ $Re(d[k+50]) = g(b_2, b_3) - 4 \times g(b_6, b_7)$ $Im(d[k]) = 4 \times g(b_0, b_1) + g(b_4, b_5)$ $Im(d[k+50]) = g(b_0, b_1) - 4 \times g(b_4, b_5)$ where $g(0,0)=3, g(0,1)=1, g(1,0)=-3, g(1,1)=-1$.

In the receiver, just as with DCM, the two incoming values and their channel estimates can be represented using $r_1 = y_1/h_1$ and $r_2 = y_2/h_2$.

As an example, for $b_0$, the 8 points corresponding to $b_0 = 0$ ($b_1, b_4, b_5 = 0, 1$) are:

$\rho_1 \times (4 \times g(0,b_1) + g(b_4,b_5)) + j \times \rho_2 \times (g(0, b_1) - 4 \times g(b_4, b_5))/\text{sqrt}(170)$ and the 8 points corresponding to bit0=1 are:

$\rho_1 \times (4 \times g(1,b_1) + g(b_4,b_5)) + j \times \rho_2 \times (g(1, b_1) - 4 \times g(b_4, b_5))/\text{sqrt}(170)$ We should find the closest match of these to $\rho_1 \times \Im(r_1) + j \times \rho_2 \times \Im(r_2)$ So, LLR(b0)=min of (showing bits $b_0\ b_1\ b_4\ b_5$ in that order, at the start of each line):

$\rho_1 \times ((4 \times 3+3)/\text{sqrt}(170) - \text{Im}(r1))^{}2 + \rho_2 \times ((3-4 \times 3)/\text{sqrt}(170) - \text{Im}(r2))^{}2$  0000

$\rho_1 \times ((4 \times 1+3)/\text{sqrt}(170) - \text{Im}(r1))^{}2 + \rho_2 \times ((1-4 \times 3)/\text{sqrt}(170) - \text{Im}(r2))^{}2$  0100

$\rho_1 \times ((4 \times 3-3)/\text{sqrt}(170) - \text{Im}(r1))^{}2 + \rho_2 \times ((3-4 \times -3)/\text{sqrt}(170) - \text{Im}(r2))^{}2$  0010

$\rho_1 \times ((4 \times 1-3)/\text{sqrt}(170) - \text{Im}(r1))^{}2 + \rho_2 \times ((1-4 \times -3)/\text{sqrt}(170) - \text{Im}(r2))^{}2$  0110

$\rho_1 \times ((4 \times 3+1)/\text{sqrt}(170) - \text{Im}(r1))^{}2 + \rho_2 \times ((3-4 \times 1)/\text{sqrt}(170) - \text{Im}(r2))^{}2$  0001

$\rho_1 \times ((4 \times 1+1)/\text{sqrt}(170) - \text{Im}(r1))^{}2 + \rho_2 \times ((1-4 \times 1)/\text{sqrt}(170) - \text{Im}(r2))^{}2$  0101

$\rho_1 \times ((4 \times 3-1)/\text{sqrt}(170) - \text{Im}(r1))^{}2 + \rho_2 \times ((3-4 \times -1)/\text{sqrt}(170) - \text{Im}(r2))^{}2$  0011

$\rho_1 \times ((4 \times 1-1)/\text{sqrt}(170) - \text{Im}(r1))^{}2 + \rho_2 \times ((1-4 \times -1)/\text{sqrt}(170) - \text{Im}(r2))^{}2$  0111 minus min of $\rho_1 \times ((4 \times -3+3)/\text{sqrt}(170) - \text{Im}(r1))^{}2 + \rho_2 \times ((-3-4 \times 3)/\text{sqrt}(170) - \text{Im}(r2))^{}2$  1000

$\rho_1 \times ((4 \times -1+3)/\text{sqrt}(170) - \text{Im}(r1))^{}2 + \rho_2 \times ((-1-4 \times 3)/\text{sqrt}(170) - \text{Im}(r2))^{}2$  1100

$\rho_1 \times ((4 \times -3-3)/\text{sqrt}(170) - \text{Im}(r1))^{}2 + \rho_2 \times ((-3-4 \times -3)/\text{sqrt}(170) - \text{Im}(r2))^{}2$  1010

$\rho_1 \times ((4 \times -1-3)/\text{sqrt}(170) - \text{Im}(r1))^{}2 + \rho_2 \times ((-1-4 \times -3)/\text{sqrt}(170) - \text{Im}(r2))^{}2$  1110

$\rho_1 \times ((4 \times -3+1)/\text{sqrt}(170) - \text{Im}(r1))^{}2 + \rho_2 \times ((-3-4 \times 1)/\text{sqrt}(170) - \text{Im}(r2))^{}2$  1001

$\rho_1 \times ((4 \times -1+1)/\text{sqrt}(170) - \text{Im}(r1))^{}2 + \rho_2 \times ((-1-4 \times 1)/\text{sqrt}(170) - \text{Im}(r2))^{}2$  1101

$\rho_1 \times ((4 \times -3-1)/\text{sqrt}(170) - \text{Im}(r1))^{}2 + \rho_2 \times ((-3-4 \times -1)/\text{sqrt}(170) - \text{Im}(r2))^{}2$  1011

$\rho_1 \times ((4 \times -1-1)/\text{sqrt}(170) - \text{Im}(r1))^{}2 + \rho_2 \times ((-1-4 \times -1)/\text{sqrt}(170) - \text{Im}(r2))^{}2$  1111

Each expression $$\rho\left(\frac{n}{\sqrt{170}} - \Im(r)\right)^2,$$

where n is the integer multiplier in brackets—for example in the first term of 0000, (4×3+3)—can be re-expressed as $$\rho\left(\frac{n^2}{170} - \frac{2n\Im(r)}{\sqrt{170}} + \Im(r)^2\right).$$

All the $\rho_1 \Im(r_1)^2$ and $\rho_2 \Im(r_2)^2$ terms cancel, so we can rewrite this as $$\rho\left(\frac{n^2}{170} - \frac{2n\Im(r)}{\sqrt{170}}\right).$$

We aim to get closer to a form that shares any multiply activity between the decode of many bits, and preferably therefore this is rearranged as:

$$\frac{\rho}{170} \times n^2 - \sqrt{2}\rho \Im(r) \times \frac{\sqrt{2}}{\sqrt{170}} \times n.$$

Here $\sqrt{2}\rho\Im(r)$ is shared, the value n is in each case a small integer, and a wide range of values for n is used, so that these multiplications can be done efficiently using adders, with a great deal of sharing and reuse (for example, given ×n an add can be used to generate ×(n+1)).

We can now re-express the determination of LLR(b0) as follows:

$LLR(b_0) =$ $$\min \text{ of} \begin{pmatrix} \rho_1 \times (1/170) \times 15^2 - \sqrt{2}\rho_1\Im(r_1) \times (\sqrt{2}/\sqrt{170}) \times 15 + \\ \rho_2 \times (1/170) \times 9^2 - \sqrt{2}\rho_2\Im(r_2) \times (\sqrt{2}/\sqrt{170}) \times -9 \\ \rho_1 \times (1/170) \times 7^2 - \sqrt{2}\rho_1\Im(r_1) \times (\sqrt{2}/\sqrt{170}) \times 7 + \\ \rho_2 \times (1/170) \times 11^2 - \sqrt{2}\rho_2\Im(r_2) \times (\sqrt{2}/\sqrt{170}) \times -11 \\ \rho_1 \times (1/170) \times 9^2 - \sqrt{2}\rho_1\Im(r_1) \times (\sqrt{2}/\sqrt{170}) \times 9 + \\ \rho_2 \times (1/170) \times 15^2 - \sqrt{2}\rho_2\Im(r_2) \times (\sqrt{2}/\sqrt{170}) \times 15 \\ \rho_1 \times (1/170) \times 1^2 - \sqrt{2}\rho_1\Im(r_1) \times (\sqrt{2}/\sqrt{170}) \times 1 + \\ \rho_2 \times (1/170) \times 13^2 - \sqrt{2}\rho_2\Im(r_2) \times (\sqrt{2}/\sqrt{170}) \times 13 \\ \rho_1 \times (1/170) \times 13^2 - \sqrt{2}\rho_1\Im(r_1) \times (\sqrt{2}/\sqrt{170}) \times 13 + \\ \rho_2 \times (1/170) \times 1^2 - \sqrt{2}\rho_2\Im(r_2) \times (\sqrt{2}/\sqrt{170}) \times -1 \\ \rho_1 \times (1/170) \times 5^2 - \sqrt{2}\rho_1\Im(r_1) \times (\sqrt{2}/\sqrt{170}) \times 5 + \\ \rho_2 \times (1/170) \times 3^2 - \sqrt{2}\rho_2\Im(r_2) \times (\sqrt{2}/\sqrt{170}) \times -3 \\ \rho_1 \times (1/170) \times 11^2 - \sqrt{2}\rho_1\Im(r_1) \times (\sqrt{2}/\sqrt{170}) \times 11 + \\ \rho_2 \times (1/170) \times 7^2 - \sqrt{2}\rho_2\Im(r_2) \times (\sqrt{2}/\sqrt{170}) \times 7 \\ \rho_1 \times (1/170) \times 3^2 - \sqrt{2}\rho_1\Im(r_1) \times (\sqrt{2}/\sqrt{170}) \times 3 + \\ \rho_2 \times (1/170) \times 5^2 - \sqrt{2}\rho_2\Im(r_2) \times (\sqrt{2}/\sqrt{170}) \times 5 \end{pmatrix} -$$

$$\min \text{ of} \begin{pmatrix} \rho_1 \times (1/170) \times 9^2 - \sqrt{2}\rho_1\Im(r_1) \times (\sqrt{2}/\sqrt{170}) \times -9 + \\ \rho_2 \times (1/170) \times 15^2 - \sqrt{2}\rho_2\Im(r_2) \times (\sqrt{2}/\sqrt{170}) \times -15 \\ \rho_1 \times (1/170) \times 1^2 - \sqrt{2}\rho_1\Im(r_1) \times (\sqrt{2}/\sqrt{170}) \times -1 + \\ \rho_2 \times (1/170) \times 13^2 - \sqrt{2}\rho_2\Im(r_2) \times (\sqrt{2}/\sqrt{170}) \times -13 \\ \rho_1 \times (1/170) \times 15^2 - \sqrt{2}\rho_1\Im(r_1) \times (\sqrt{2}/\sqrt{170}) \times -15 + \\ \rho_2 \times (1/170) \times 9^2 - \sqrt{2}\rho_2\Im(r_2) \times (\sqrt{2}/\sqrt{170}) \times 9 \\ \rho_1 \times (1/170) \times 7^2 - \sqrt{2}\rho_1\Im(r_1) \times (\sqrt{2}/\sqrt{170}) \times -7 + \\ \rho_2 \times (1/170) \times 11^2 - \sqrt{2}\rho_2\Im(r_2) \times (\sqrt{2}/\sqrt{170}) \times 11 \\ \rho_1 \times (1/170) \times 11^2 - \sqrt{2}\rho_1\Im(r_1) \times (\sqrt{2}/\sqrt{170}) \times -11 + \\ \rho_2 \times (1/170) \times 7^2 - \sqrt{2}\rho_2\Im(r_2) \times (\sqrt{2}/\sqrt{170}) \times -7 \\ \rho_1 \times (1/170) \times 3^2 - \sqrt{2}\rho_1\Im(r_1) \times (\sqrt{2}/\sqrt{170}) \times -3 + \\ \rho_2 \times (1/170) \times 5^2 - \sqrt{2}\rho_2\Im(r_2) \times (\sqrt{2}/\sqrt{170}) \times -5 \\ \rho_1 \times (1/170) \times 13^2 - \sqrt{2}\rho_1\Im(r_1) \times (\sqrt{2}/\sqrt{170}) \times -13 + \\ \rho_2 \times (1/170) \times 1^2 - \sqrt{2}\rho_2\Im(r_2) \times (\sqrt{2}/\sqrt{170}) \times 1 \\ \rho_1 \times (1/170) \times 5^2 - \sqrt{2}\rho_1\Im(r_1) \times (\sqrt{2}/\sqrt{170}) \times -5 + \\ \rho_2 \times (1/170) \times 3^2 - \sqrt{2}\rho_2\Im(r_2) \times (\sqrt{2}/\sqrt{170}) \times 3 \end{pmatrix}$$

Each of the other 3 bits $b_1$, $b_4$, $b_5$ have similar expressions. The bits $b_2$, $b_3$, $b_6$, $b_7$ are constructed in the same way, using the real parts of the incoming coordinate values. Broadly speaking, each line of the above expression corresponds to a combined distance function of received signals on a pair of carriers from a pair of MCDM constellation points. Inspection of the above expression and of the full set of expressions reveals that only 16 combinations of the constants ever appear, corresponding to the 16 constellation points of the precode values.

Hardware Implementation:

In embodiments the hardware decodes 55 carrier pairs (including the guard carriers) in each symbol time (the LDPC code may be extended to use the guard tones of the UWB OFDM signal to carry additional parity check bits). A symbol time is 41 cycles at 132 MHz, or 83 cycles at 264 MHz.

Figure 5A:
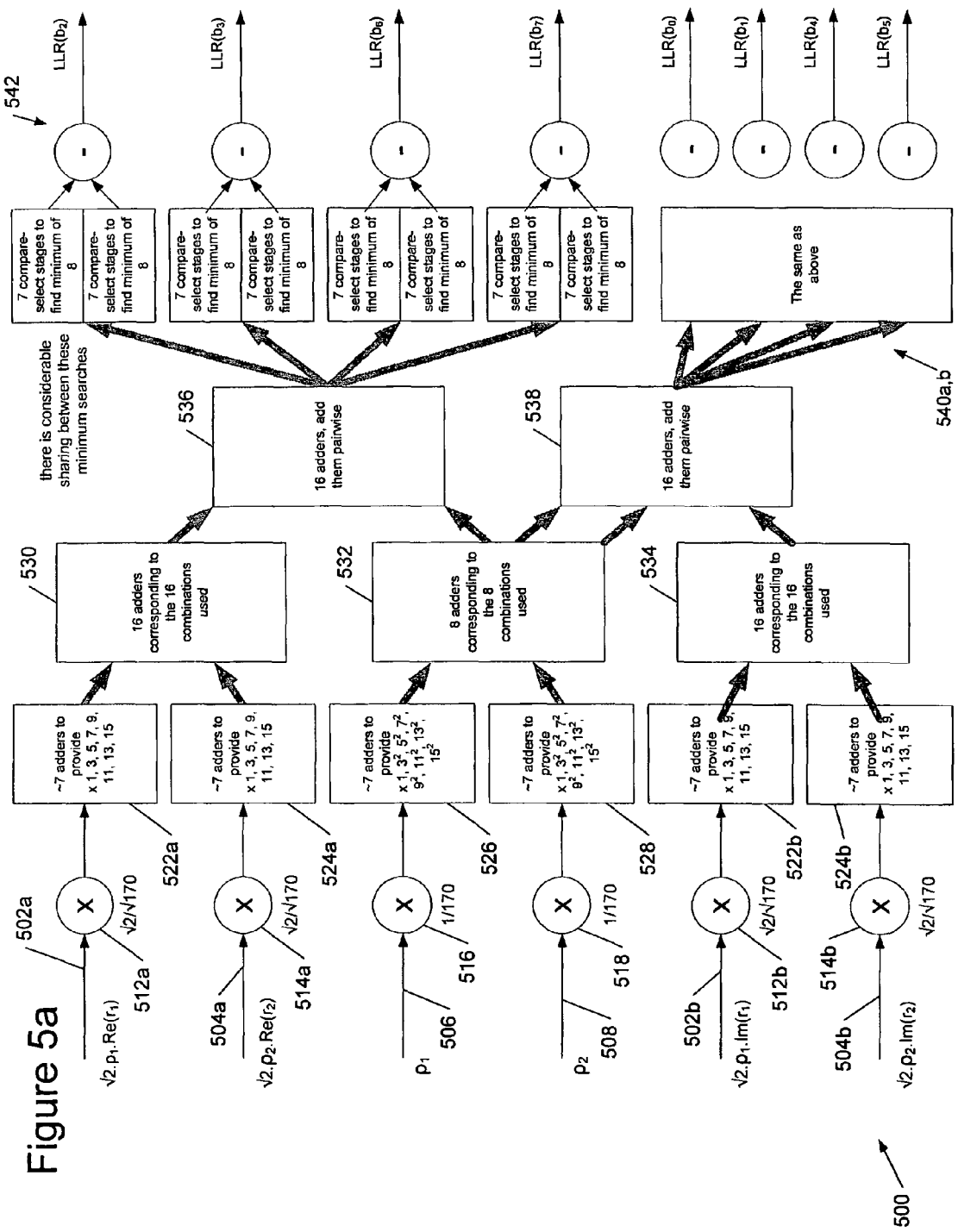
FIGS. 5a and 5b show, respectively, a block diagram of an MDCM decoder according to an embodiment of the invention, and an MCDM constellation.

In order to demodulate one carrier pair—8 demodulated bits—the channel equalisation (CEQ) block passes to the decoder the values $\rho_1$ and $\rho_2$, and the values $\sqrt{2}\rho_1\Re$, $(r_1)$, $\sqrt{2}\rho_1\Im(r_1, \sqrt{2}\rho\Re, (r_2)$ and $\sqrt{2}\rho_2\Im(r_2)$. The multiplications by 1, 3, 5, 7, 9, 11, 13, 15 are preferably performed with 7 adders. FIG. 5a shows an embodiment of decoder hardware 500 for demodulating an MCDM coordinate pair.

Referring to FIG. 5a, first and second inputs 502a,b, 504a,b each receive real and imaginary components of complex valued data generated from received signal data for first and second respective OFDM carriers and corresponding channel estimate data, preferably combined with noise level data, for example from a pre-processor 206 of the general type shown in FIG. 2b. Third and fourth inputs 506, 508 receive values of ρ for the respective first and second carriers; as previously mentioned in embodiments ρ broadly defines a signal power or signal-to-noise ratio for a carrier. The first and second inputs are scaled by respective multipliers 512a,b, 514a,b multiplying by $$\frac{\sqrt{2}}{\sqrt{170}}$$

and the third and fourth inputs are scaled by respective multipliers 516, 518 multiplying by $$\frac{1}{\sqrt{170}}.$$

Each multiplier 512a,b, 514a,b, 516, 518 provides an output to a respective integer arithmetic unit 522a,b, 524a,b, 526,.528, preferably each configured as a set of adders. Each of these sets of adders provides eight outputs in parallel (seven if not counting a ×1 pass-though output), for the signal derived data from inputs 502, 504 ×1,3,5,7,9,11,13,15, and for the channel quality estimate derived data from inputs 506, 508 ×$1^2$,$3^2$,$5^2$,$7^2$,$9^2$,$11^2$,$13^2$,$15^2$. For example, ×3 is a shift (×2) and an add (of a ×1 value); ×5 is a shift (×4) and an add (of ×1); ×7 is a shift (×8) and a subtract (of ×1); ×9 is a shift (×8) and an add (of ×1); ×11 is ×9 and an add (of ×2); ×13 is ×15 and a subtract (of ×2); and ×15 is a shift (×16) and a subtract (of ×1). The squared terms may be generated similarly, for example, ×9 is a shift (×8) and an add (of ×1); ×25 is a shift (×16) and an add (of ×1), and so forth. Thus in embodiments an arithmetic unit may consist essentially of shift unit(s) and add/subtract unit(s). The skilled person will understand that many variants of this implementation are possible depending, for example, on hardware speed/size trade-offs.

Outputs from the arithmetic units are paired to provide a pair of inputs to sets of adders 530, 532, 534; these generate the intermediate terms which are used in combination in the distance expressions in the bit LLR calculations (minimum (joint carrier) distances being selected for use in bit LLR determination). In more detail each arithmetic unit 522a, 524a processing real signal data from a pair of carriers provides a set of parallel inputs to a set of adders 530; each multiply unit 522b 524b processing imaginary signal data from the same pair of carriers provides a set of parallel inputs to a set of adders 534; and each multiply unit 526, 528 processing carrier channel quality data from the pair of carriers provides a set of parallel inputs to a set of adders 532.

A first further set of adders 536 then combines the intermediate terms from adders 530 and 532; and a second further set of adders 538 combines the intermediate terms from adders 532 and 534. Adders 536, which process the real signal data, generate distance terms for bits $b_2$ $b_3$ $b_6$ $b_7$ and adders 538, which process the imaginary signal data, generate distance terms for bits $b_0$ $b_1$ $b_4$ $b_5$. (The skilled person will recognise that, depending on trade-offs for example between layout area and speed/power, the hardware for processing real and imaginary signal components may be shared or in parallel—the hardware of FIG. 5a is substantially symmetrical for bits $b_2$ $b_3$ $b_6$ $b_7$ and bits $b_0$ $b_1$ $b_4$ $b_5$).

Outputs from adders 536, 538 provide combinations of intermediate terms representing joint carrier-constellation point distances for pairs of carriers. Each bit LLR is determined from two groups of 8 distance terms, and for each bit decoded in parallel these two groups of 8 distance terms are provided to two respective compare select stages 540a,b. The outputs from each of these compare select stages 540a,b provides an input to a subtracter 542 which calculates an LLR value for the respective bit. Again the skilled person will recognise that depending on trade offs, some or all of the compare-select stages may be shared.

In embodiments the decoder hardware may employ two or three (or even more) units of the type illustrated in FIG. 5a, depending on clock speed. A faster clock speed could increase the pipelining required, although a pipeline stage in the middle of the diagram of FIG. 5a would be extremely wide, employing around eight times as many flip-flops as a pipeline stage at the start or end.

In a variant the inputs 502-508 to the MCDM decoder may all be prescaled. For example if prescaled by 170 multipliers 516, 518 may be omitted and multipliers 512a,b, 514a,b multiply by $\sqrt{2}.\sqrt{170}$. In general the inputs may all be scaled in a consistent manner for efficient hardware implementation.

Referring again to FIG. 5a it can be seen that, apart from the initial scaling, no multipliers are needed. There are, however, many addition operations. Counting all add/subtract/compare operations equally there are approximately $6\times7+3\times16+2\times16+8\times15=242$ such operations, or around 32 per output LLR soft value. In embodiments the comparison stages may share some of the min-select operations. The multiply-by-constant (scaling) operations are not accounted for in the above estimate, but do not have a significant impact. This compares with around 10 additions per bit for DCM demodulation. As the hardware processes twice as many bits as DCM, the absolute hardware requirement is around six times greater. Suitable fixed-point bit accuracy and range have yet to be determined but initial work on LDPC suggests that 4-bit or 5-bit output LLR values will be suitable.

In a similar manner to that described above for DCM, once bit LLRs have been determined a (combined) distance from a (pair of) constellation point(s) may be determined by making a hard decision for each bit, for example on the bit LLR values output from the MDCM decoder. From this an estimate of the noise on each carrier may be determined and used to determine an improved estimate of $\rho_1$ and $\rho_2$ for input to the MCDM decoder (by analogy with FIGS. 2b and 2c, described above).

Figure 5B:
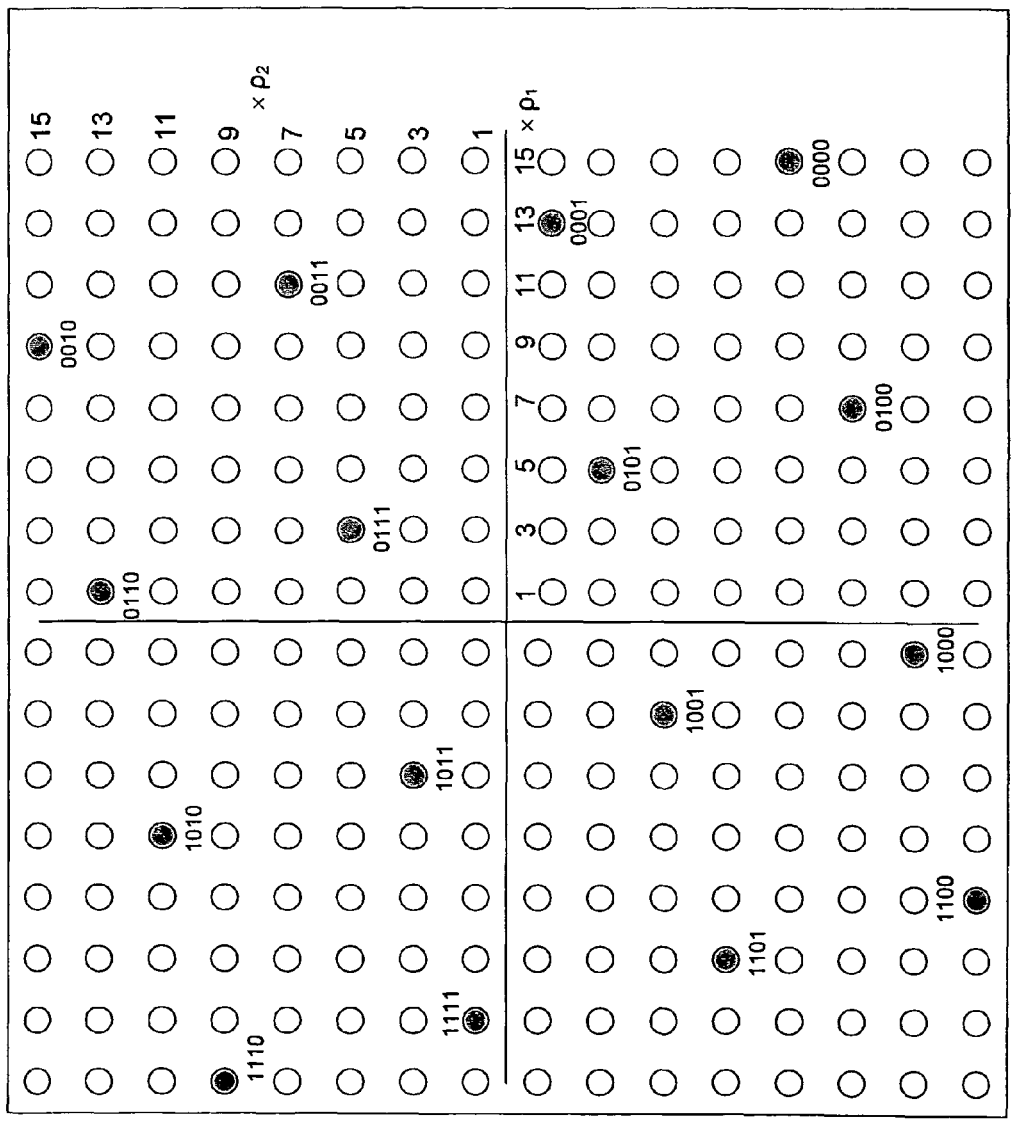

Variant:

FIG. 5b shows an MCDM constellation with the constellation points the system is trying to hit, labelled with the corresponding values of $b_0$, $b_1$, $b_4$, $b_5$. This is strongly related to the decoding of a 16 QAM Gray-coded constellation, except that the constellation has been distorted by the $\rho_1$ in the real axis and $\rho_2$ in the imaginary axis; and also rotated. The inventors have recognised that some techniques for decoding 16 QAM may therefore be adapted to decoding MCDM.

Multiplication by $(4\rho_1-j\rho_2)$ will derotate these constellation points. If this is done both to the constellation points and to the incoming data then demodulation becomes more like 16 QAM, with only distortion by $\rho_1$ and $\rho_2$ to consider.

In the previous form, and considering bit $b_0$ (for example), the 8 points corresponding to $b_0=0$ are:

$$\rho_1\times(4\times g(0,b_1)+g(b_4,b_5))+j\times\rho_2\times(g(0, b_1)-4\times g(b_4, b_5))/\mathrm{sqrt}(170)$$

and the 8 points corresponding to $b_0=1$ are:

$$\rho_1\times(4\times g(1,b_1)+g(b_4,b_5))+j\times\rho_2\times(g(1, b_1)-4\times g(b_4, b_5))/\mathrm{sqrt}(170)$$

We should find the closest match of these to $$\rho_1\times\Im(r_1)+j\times\rho_2\times\Im(r_2)$$

In general: $(a+bj)(4\rho_1-j\rho_2)=(4a\rho_1+b\rho_2)+j(4b\rho_1-a\rho_2)$

The 16 constellation points are:

$$((\rho_1\times(4\times g(b_0,b_1)+g(b_4,b_5))+j(\rho_2\times(g(b_0,b_1)-4\times g(b_4,b_5)))/\sqrt{170}$$

This can be expressed as:

$$(\rho_1 N_{1,i}+j\rho_2 N_{2,i})/\sqrt{170}$$

where the N values are integer constants relevant to each constellation point i. When rotated these become:

$$(4\rho_1\rho_1 N_{1,i}+\rho_2\rho_2 N_{2,i}+j(4\rho_1\rho_2 N_{2,i}-\rho_2\rho_1 N_{1,i}))/\sqrt{170}=(4\rho_1{}^2 N_{1,i}+\rho_2{}^2 N_{2,i}+j\rho_1\rho_2(4N_{2,i}-N_{1,i}))/\sqrt{170}$$

We therefore aim to find the closest match of these to the rotated target:

$$(4\rho_1{}^2\Im(r_1)+\rho_2{}^2\Im(r_2))+j\rho_1\rho_2(4\Im(r_2)-\Im(r_1))$$

Figure 5C:
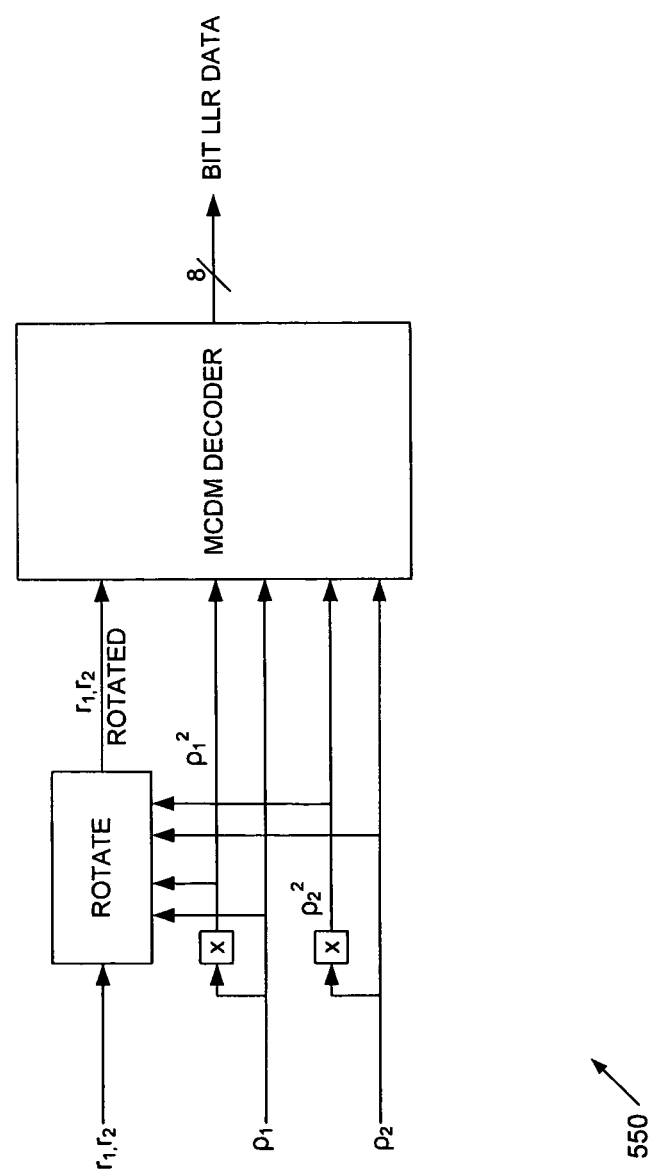
FIG. 5c shows, a block diagram of a decoder in accordance with one embodiment of the disclosure.

The max-log representation can be derived in a similar manner to the examples given previously. This leads to the decoder 550 of FIG. 5c which, in embodiments, may result in a reduced hardware cost, in particular with some multiplies (for the rotation) but fewer additive operations.

UWB Transceivers

Figure 6:
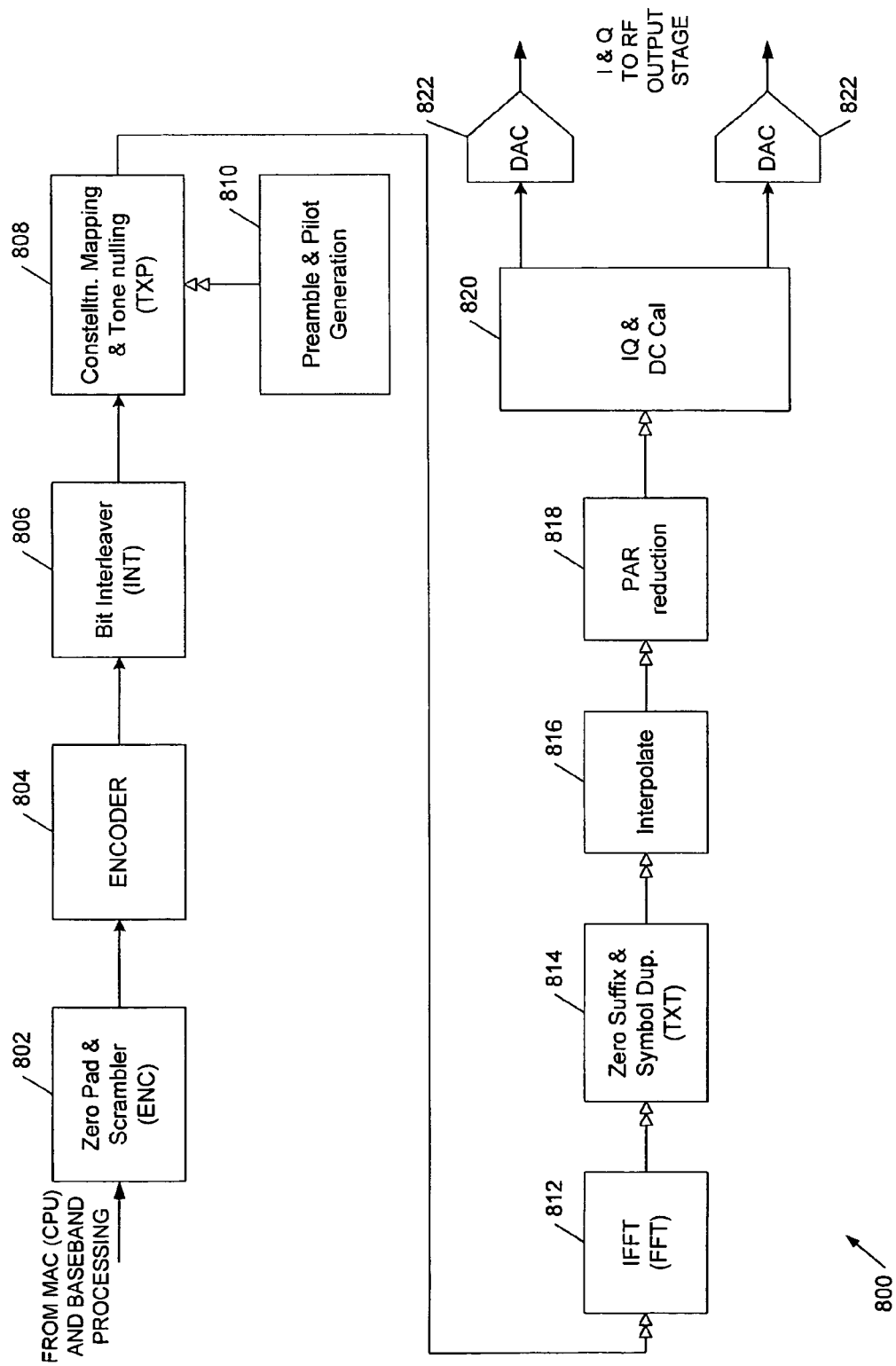
FIG. 6 shows a block diagram of a digital OFDM UWB transmitter sub-system.
Figure 7:
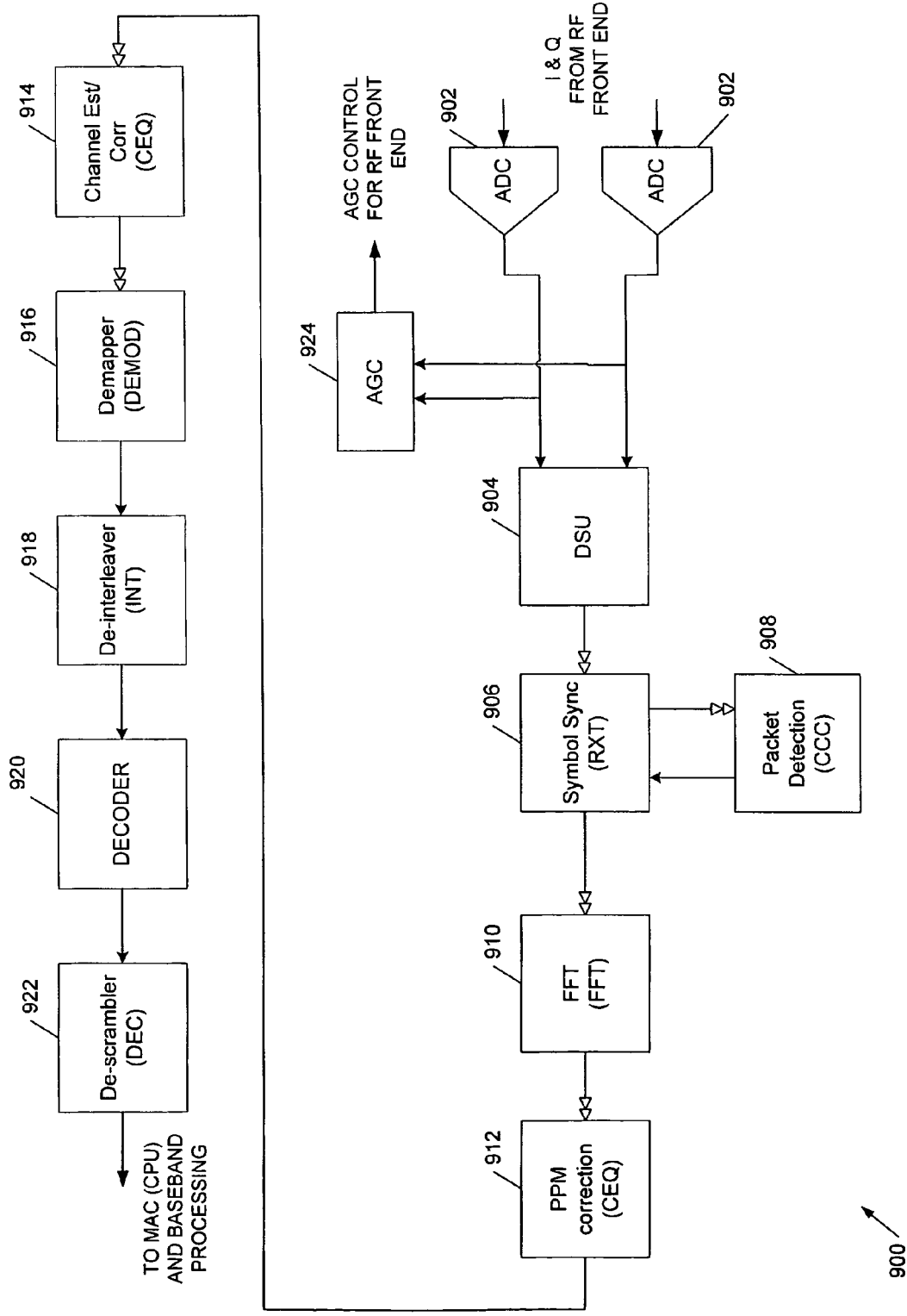
FIG. 7 shows a block diagram of a digital OFDM UWB receiver sub-system.

FIGS. 6 to 8 below show functional and structural block diagrams of an OFDM UWB transceiver which may incorporate a decoder as described above. Depending upon the implementation, as previously noted, the demodulator may replace both channel equalisation and demodulation blocks following the FFT unit.

Thus referring to FIG. 6, this shows a block diagram of a digital transmitter sub-system 800 of an OFDM UWB transceiver. The sub-system in FIG. 6 shows functional elements; in practice hardware, in particular the (I) FFT may be shared between transmitting and receiving portions of a transceiver since the transceiver is not transmitting and receiving at the same time.

Data for transmission from the MAC CPU (central processing unit) is provided to a zero padding and scrambling module 802 followed by a encoder 804 for forward error correction and bit interleaver 806 prior to constellation mapping and tone nulling 808. In embodiments the encoder 804 comprises is able to perform both convolutional encoding and LDPC encoding. At this point pilot tones are also inserted and a synchronisation sequence is added by a preamble and pilot generation module 810. An IFFT 812 is then performed followed by zero suffix and symbol duplication 814, interpolation 816 and peak-2-average power ratio (PAR) reduction 818 (with the aim of minimising the transmit power spectral density whilst still providing a reliable link for the transfer of information). The digital output at this stage is then converted to I and Q samples at approximately 1 Gsps in a stage 820 which is also able to perform DC calibration, and then these I and Q samples are converted to the analogue domain by a pair of DACs 822 and passed to the RF output stage.

FIG. 7 shows a digital receiver sub-system 900 of a UWB OFDM transceiver. Referring to FIG. 7, analogue I and Q signals from the RF front end are digitised by a pair of ADCs 902 and provided to a down sample unit (DSU) 904. Symbol synchronisation 906 is then performed in conjunction with packet detection/synchronisation 908 using the preamble synchronisation symbols. An FFT 910 then performs a conversion to the frequency domain and PPM (parts per million) clock correction 912 is performed followed by channel estimation and correlation 914. After this the received data is demodulated 916, de-interleaved 918, decoded 920, de-scrambled 922 and the recovered data output to the MAC. In embodiments the decoder 920 is able to perform both Viterbi decoding and LDPC decoding. An AGC (automatic gain control) unit is coupled to the outputs of a ADCs 902 and feeds back to the RF front end for AGC control, also on the control of the MAC.

Figure 8A:
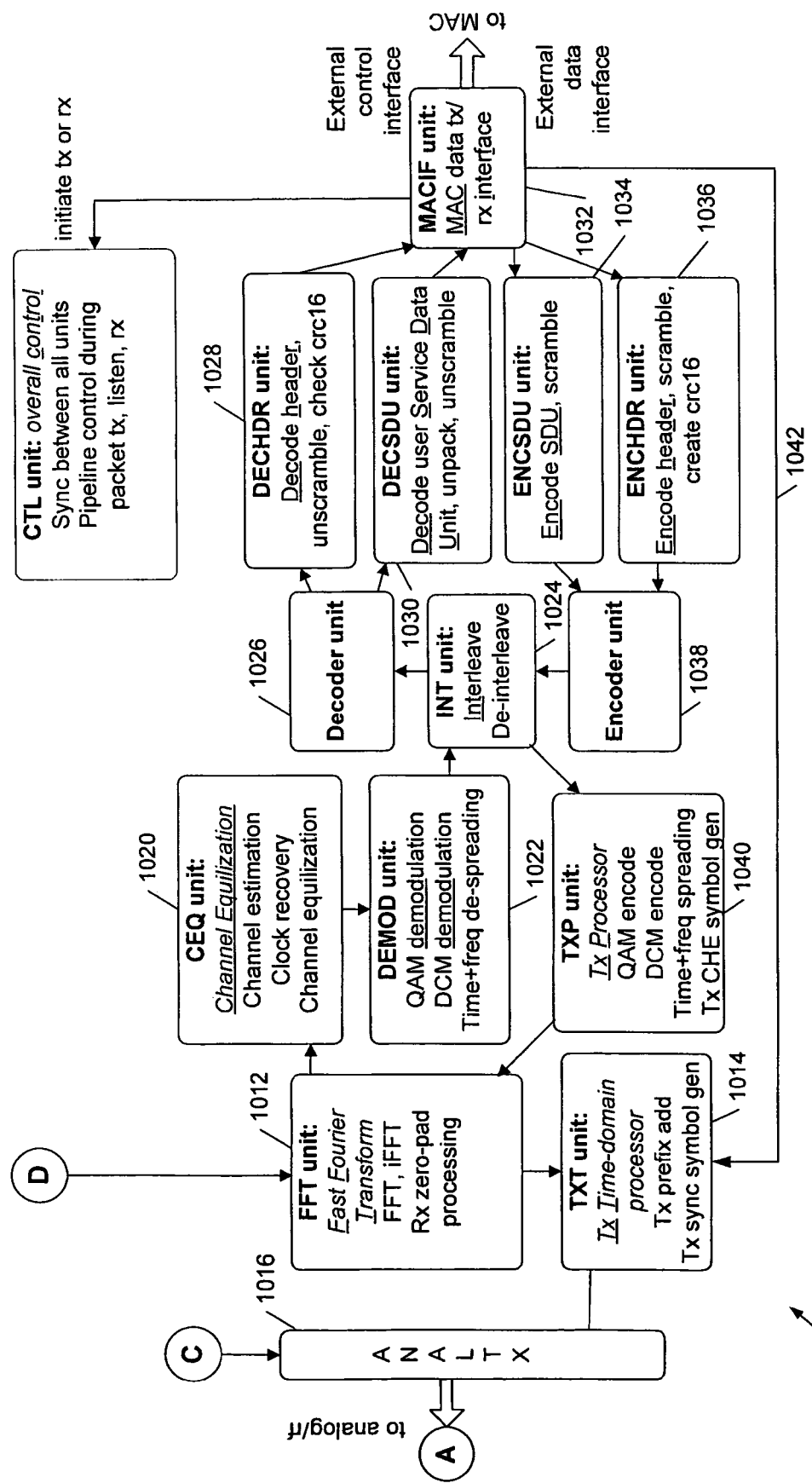

FIG. 8a shows a block diagram of physical hardware modules of a UWB OFDM transceiver 1000 which implements the transmitter and receiver functions depicted in FIGS. 6 and 7. The labels in brackets in the blocks of FIGS. 8 and 9 correspond with those of FIG. 8a, illustrating how the functional units are mapped to physical hardware.

Referring to FIG. 8a an analogue input 1002 provides a digital output to a DSU (down sample unit) 1004 which converts the incoming data at approximately 1 Gsps to 528 Mz samples, and provides an output to an RXT unit (receive time-domain processor) 1006 which performs sample/cycle alignment. An AGC unit 1008 is coupled around the DSU 1004 and to the analogue input 1002. The RXT unit provides an output to a CCC (clear channel correlator) unit 1010 which detects packet synchronisation; RXT unit 1006 also provides an output to an FFT unit 1012 which performs an FFT (when receiving) and IFFT (when transmitting) as well as receiver 0-padding processing. The FFT unit 1012 has an output to a TXT (transmit time-domain processor) unit 1014 which performs prefix addition and synchronisation symbol generation and provides an output to an analogue transmit interface 1016 which provides an analogue output to subsequent RF stages. A CAP (sample capture) unit 1018 is coupled to both the analogue receive interface 1002 and the analogue transmit interface 1016 to facilitate debugging, tracing and the like. Broadly speaking this comprises a large RAM (random access memory) buffer which can record and playback data captured from different points in the design.

The FFT unit 1012 provides an output to a CEQ (channel equalisation unit) 1020 which performs channel estimation, clock recovery, and channel equalisation and provides an output to a DEMOD unit 1022 which performs QAM demodulation, DCM (dual carrier modulation) demodulation, and time and frequency de-spreading, providing an output to an INT (interleave/de-interleave) unit 1024. The INT unit 1024 provides an output to a decoder VIT (Viterbi decode) unit 1026 which also performs de-puncturing of the code, this providing outputs to a header decode (DECHDR) unit 1028 which also unscrambles the received data and performs a CRC 16 check, and to a decode user service data unit (DECSDU) unit 1030, which unpacks and unscrambles the received data. Both DECHDR unit 1028 and DECSDU unit 1030 provide output to a MAC interface (MACIF) unit 1032 which provides a transmit and receive data and control interface for the MAC.

In the transmit path the MACIF unit 1032 provides outputs to an ENCSDU unit 1034 which performs service data unit encoding and scrambling, and to an ENCHDR unit 1036 which performs header encoding and scrambling and also creates CRC 16 data. Both ENCSDU unit 1034 and ENCHDR unit 1036 provide output to a convolutional encode (CONV) unit 1038 which also performs puncturing of the encoded data, and this provides an output to the interleave (INT) unit 1024. The INT unit 1024 then provides an output to a transmit processor (TXP) unit 1040 which, in embodiments, performs QAM and DCM encoding, time-frequency spreading, and transmit channel estimation (CHE) symbol generation, providing an output to (I)FFT unit 1012, which in turn provides an output to TXT unit 1014 as previously described.

The decoder unit 1026 preferably comprises an LDPC decoder (as described, for example, in our co-pending applications GB0810901.9 and U.S. 61/073,265, hereby incorporated by reference), and also a Viterbi decoder, VIT (which in addition performs de-puncturing of the code), to provide backwards/lower data rate compatibility and for the headers. Similarly the encoder unit 1038 comprises an LDPC encoder and also a convolutional encoder, CONV (which in addition performs puncturing of the encoded data). The ENCHDR and DECHDR units thus still feed to and from CONV and VIT units. When using the LDPC coding interleave is not required as interleaving is effectively performed as part of the LDPC coding. In this case the interleave unit 1024 may operate in a pass-through mode when LDPC coding is being employed; similarly interleaver/de-interleaver units 806, 918 described above may operate in a pass-through mode when LDPC coding is used.

Figures 8A, 8B:
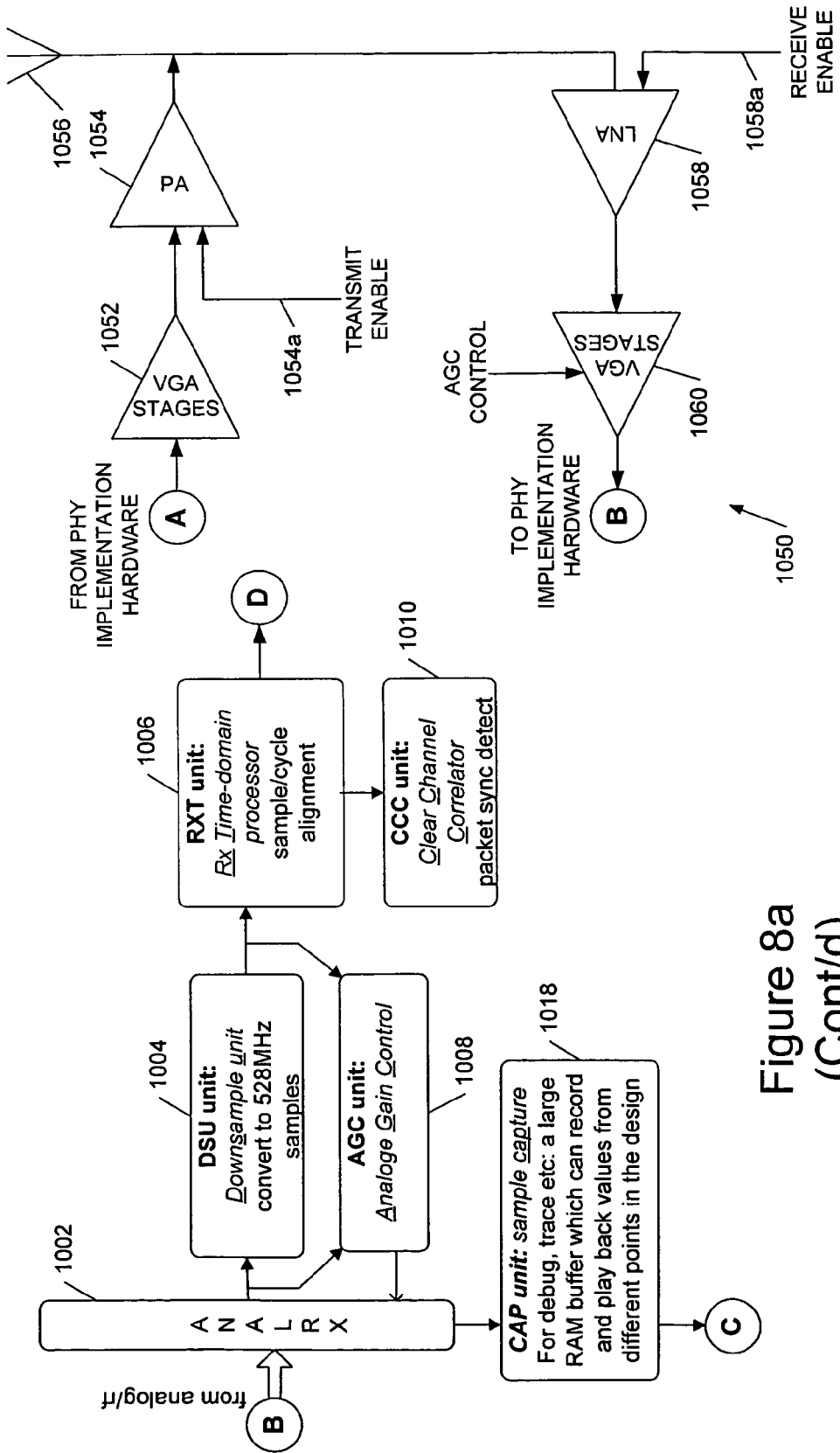

Referring now to FIG. 8b, this shows, schematically, RF input and output stages 1050 for the transceiver of FIG. 8a. The RF output stages comprise VGA stages 1052 followed by a power amplifier 1054 coupled to antenna 1056. The RF input stages comprise a low noise amplifier 1058, coupled to antenna 1056 and providing an output to further multiple VGA stages 1060 which provide an output to the analogue receive input 1002 of FIG. 8a. The power amplifier 1054 has a transmit enable control 1054a and the LNA 1058 has a receive enable control 1058a; these are controlled to switch rapidly between transmit and receive modes.

No doubt many other effective alternatives will occur to the skilled person. For example, although we have described some specific examples using (weighted) Euclidean distance metrics (an $L_2$ norm) the skilled person will appreciate that many other (weighted) distance metrics may be employed, including, but not limited to, metrics measured by an $L_1$ norm and an $L \infty$ norm.

It is to be appreciated that the Detailed Description section, and not the Summary and Abstract sections, is intended to be used to interpret the claims. The Summary and Abstract sections may set forth one or more but not all exemplary embodiments of the present invention as contemplated by the inventor(s), and thus, are not intended to limit the present invention and the appended claims in any way.

The present invention has been described above with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

The foregoing description of the specific embodiments will so fully reveal the general nature of the invention that others can, by applying knowledge within the skill of the art, readily modify and/or adapt for various applications such specific embodiments, without undue experimentation, without departing from the general concept of the present invention. Therefore, such adaptations and modifications are intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance.

The breadth and scope of the present invention should not be limited by any of the above-described exemplary embodiments, but should be defined only in accordance with the following claims and their equivalents.

What is claimed is:

1. A modified dual carrier modulation (MDCM) decoder for MDCM decoding of an orthogonal frequency division multiplexed (OFDM) signal, the decoder comprising:
   first and second inputs to input first and second signals dependent on signals from respective first and second carriers of said OFDM signal;
   third and fourth inputs for respective third and fourth signals responsive to respective first and second channel quality estimates for said first and second carriers;
   a set of arithmetic units coupled to said first, second, third and fourth inputs to form a set of intermediate terms comprising integer multiples of signals derived from said first, second, third and fourth signals;
   a first set of adders coupled to said set of arithmetic units to form first and second sets of combinations of said intermediate terms, one set for each binary value of a bit of MDCM coded data encoded on said first and second carriers;
   at least one compare-select stage coupled to said first set of adders to select a first minimum valued said combination of said intermediate terms from said first set of combination of said intermediate terms and to select a second minimum valued said combination of said intermediate terms from said second set of combination of said intermediate terms, wherein said first and second sets of combinations of said intermediate terms each define a set of distances from a set of constellation points in which said bit has a respective first and second said binary value;
   a subtractor to determine a log likelihood ratio (LLR) value for said bit from said first and second minimum valued combinations; and
   a multiply unit to rotate said first and second signals by a factor, and wherein said constellation points comprise points rotated by substantially the same factor;
   wherein said first and second signals are dependent on a product of signals from said respective first and second carriers and squared said respective first and second channel quality estimates, and wherein said third and fourth signals are derived from squared said respective first and second channel quality estimates.

2. An MDCM decoder as claimed in claim 1 wherein each said arithmetic unit comprises a second set of adders, each said set of the second set of adders coupled to a respective one of said first, second, third and fourth inputs, and wherein said each set of said second set of adders is configured to provide, on a set of outputs, a set of said intermediate terms comprising a set of odd integer multiples or a set of squared odd integer multiples of signals derived from said first, second, third and fourth signals.

3. An MDCM decoder as claimed in claim 1 configured to decode LLR values for a plurality of said bits in parallel, and wherein said first set of adders is configured to form a plurality of pairs of said first and second sets of combinations of said intermediate terms, one said pair of said first and second sets of combinations of said intermediate terms for each said decoded bit LLR value.

4. An MDCM decoder as claimed in claim 3, wherein said first and second sets of combinations of intermediate terms comprises a combination of first and second channel intermediate terms and first and second signal intermediate terms, and wherein said first and second channel intermediate terms are dependent on said first and second channel quality estimates respectively, and wherein said first and second signal intermediate terms are dependent on a product of signals from said respective first and second carriers and said respective first and second channel quality estimates.

5. An MDCM decoder as claimed in claim 4, wherein said first set of adders includes a third set of adders to form said first and second channel intermediate terms and said first and second signal intermediate terms, and a fourth set of adders coupled to said third set of adders to combine pairs of said channel intermediate terms and said first and second signal intermediate terms to provide said combinations of intermediate terms.

6. An MDCM decoder as claimed in claim 1, wherein the MDCM decoder is part of an ultrawideband (UWB) receiver or transceiver.

7. A method of decoding an modified dual carrier modulation (MDCM) modulated orthogonal frequency division multiplexed (OFDM) signal, the method comprising:
   inputting first and second signals dependent on signals from respective first and second carriers of said OFDM signal;
   inputting third and fourth signals responsive to respective first and second channel quality estimates for said first and second carriers;
   generating a set of intermediate terms comprising integer multiples of signals derived from said first, second, third and fourth signals;
   generating first and second sets of combinations of said intermediate terms, one set for each binary value of a bit of MDCM coded data encoded on said first and second carriers;
   selecting a first and second minimum valued said combination of said intermediate terms respectively from each of said first and second sets of combinations of said intermediate terms, wherein said first and second sets of combinations of said intermediate terms each define a set of distances from a set of constellation points in which said bit has a respective first and second said binary value;

determining a log likelihood ratio (LLR) value for said bit from said first and second minimum valued combinations; and rotating said first and second signals by a factor, and wherein said constellation points comprise points rotated by substantially the same factor;

wherein said first and second signals are dependent on a product of signals from said respective first and second carriers and squared said respective first and second channel quality estimates, and wherein said third and fourth signals are derived from squared said respective first and second channel quality estimates.

8. A method as claimed in claim 7, wherein said MDCM modulated OFDM signal is a UWB signal.

* * * * *